United States Patent
Kumarasamy et al.

(10) Patent No.: US 9,342,537 B2
(45) Date of Patent: May 17, 2016

(54) INTEGRATED SNAPSHOT INTERFACE FOR A DATA STORAGE SYSTEM

(71) Applicant: CommVault Systems, Inc., Oceanport, NJ (US)

(72) Inventors: Paramasivam Kumarasamy, Morganville, NJ (US); Amit Mitkar, Neptune, NJ (US); Dmitriy Borisovich Zakharkin, Monmouth Junction, NJ (US)

(73) Assignee: CommVault Systems, Inc., Tinton Falls, NJ (US)

( * ) Notice: Subject to any disclaimer, the term of this patent is extended or adjusted under 35 U.S.C. 154(b) by 538 days.

(21) Appl. No.: 13/787,643

(22) Filed: Mar. 6, 2013

(65) Prior Publication Data

US 2013/0282662 A1    Oct. 24, 2013

Related U.S. Application Data

(60) Provisional application No. 61/637,208, filed on Apr. 23, 2012.

(51) Int. Cl.
  G06F 17/00 (2006.01)
  G06F 17/30 (2006.01)
  G06F 11/14 (2006.01)

(52) U.S. Cl.
  CPC .......... *G06F 17/30289* (2013.01); *G06F 11/14* (2013.01); *G06F 17/30575* (2013.01)

(58) Field of Classification Search
  CPC .......... G06F 17/30575; G06F 11/1469; G06F 11/1451; G06F 11/1458; G06F 11/1446; G06F 2201/84
  USPC .............. 707/649, 672, 610, 641, 655, 999.2
  See application file for complete search history.

(56) References Cited

U.S. PATENT DOCUMENTS 4,296,465 A    10/1981    Lemak
4,686,620 A    8/1987    Ng (Continued)

FOREIGN PATENT DOCUMENTS

AU    2006331932    12/2006
CA       2632935    12/2006

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Dung K Chau
(74) *Attorney, Agent, or Firm* — Knobbe, Martens, Olson & Bear, LLP

(57) ABSTRACT

A data storage system includes a generic snapshot interface, allowing for integration with a wide variety of snapshot-capable storage devices. The generic interface can be a programming interface (e.g., an application programming interface [API]). Using the snapshot interface, storage device vendors can integrate their particular snapshot technology with the data storage system. For instance, the data storage system can access a shared library of functions (e.g., a dynamically linked library [DLL]) provided by the vendor (or another by appropriate entity) and that complies with the specifications of the common programming interface. And by invoking the appropriate functions in the library, the data storage system implements the snapshot operation on the storage device.

17 Claims, 11 Drawing Sheets

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitzky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,938,135 A | 8/1999 | Sasaki et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rekieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |

(56) References Cited

U.S. PATENT DOCUMENTS

| | | |
|---|---|---|
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,557,089 B1 | 4/2003 | Reed et al. |
| 6,564,228 B1 | 5/2003 | O'Connor |
| 6,581,143 B2 | 6/2003 | Gagne et al. |
| 6,594,744 B1 | 7/2003 | Humlicek et al. |
| 6,604,118 B2 | 8/2003 | Kleinman et al. |
| 6,604,149 B1 | 8/2003 | Deo et al. |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,643,671 B2 | 11/2003 | Milillo et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,728,736 B2 | 4/2004 | Hostetter et al. |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Rohdemann et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,898,688 B2 | 5/2005 | Martin et al. |
| 6,912,482 B2 | 6/2005 | Kaiser |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,948,038 B2 | 9/2005 | Berkowitz et al. |
| 6,948,089 B2 | 9/2005 | Fujibayashi |
| 6,952,705 B2 | 10/2005 | Knoblock et al. |
| 6,952,758 B2 | 10/2005 | Chron et al. |
| 6,954,834 B2 | 10/2005 | Slater et al. |
| 6,957,362 B2 | 10/2005 | Armangau |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,086,787 B2 | 8/2006 | Beier et al. |
| 7,096,315 B2 | 8/2006 | Takeda et al. |
| 7,100,089 B1 | 8/2006 | Phelps |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,111,026 B2 | 9/2006 | Sato |
| 7,120,757 B2 | 10/2006 | Tsuge |
| 7,130,860 B2 | 10/2006 | Pachet |
| 7,130,970 B2 | 10/2006 | Devassy et al. |
| 7,139,887 B2 * | 11/2006 | Colgrove et al. ............. 711/162 |
| 7,139,932 B2 | 11/2006 | Watanabe |
| 7,155,465 B2 | 12/2006 | Lee et al. |
| 7,155,633 B2 | 12/2006 | Tuma et al. |
| 7,165,079 B1 | 1/2007 | Chen et al. |
| 7,174,352 B2 | 2/2007 | Kleinman et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,197,665 B2 | 3/2007 | Goldstein et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,246,140 B2 | 7/2007 | Therrien et al. |
| 7,246,207 B2 | 7/2007 | Kottomtharayil et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,275,277 B2 | 10/2007 | Moskovich et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,383,538 B2 | 6/2008 | Bates et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,409,509 B2 | 8/2008 | Devassy et al. |
| 7,412,583 B2 | 8/2008 | Burton et al. |
| 7,415,488 B1 | 8/2008 | Muth et al. |
| 7,421,554 B2 | 9/2008 | Colgrove et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,467,167 B2 | 12/2008 | Patterson |
| 7,467,267 B1 | 12/2008 | Mayock |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B2 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyil et al. |
| 7,523,483 B2 | 4/2009 | Dogan |
| 7,529,748 B2 | 5/2009 | Wen et al. |

(56) References Cited

U.S. PATENT DOCUMENTS

| | | |
|---|---|---|
| 7,529,782 B2 | 5/2009 | Prahlad et al. |
| 7,532,340 B2 | 5/2009 | Koppich et al. |
| 7,536,291 B1 | 5/2009 | Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,581,077 B2 | 8/2009 | Ignatius et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,620,666 B1 | 11/2009 | Root et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,664,771 B2 | 2/2010 | Kusters et al. |
| 7,668,798 B2 | 2/2010 | Scanlon et al. |
| 7,669,029 B1 | 2/2010 | Mishra et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,716,171 B2 | 5/2010 | Kryger |
| 7,734,578 B2 | 6/2010 | Prahlad et al. |
| 7,734,715 B2 | 6/2010 | Hyakutake et al. |
| 7,739,235 B2 | 6/2010 | Rousseau et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,870,355 B2 | 1/2011 | Erofeev |
| 7,930,274 B2 | 4/2011 | Hwang et al. |
| 7,930,476 B1 | 4/2011 | Castelli et al. |
| 7,962,455 B2 | 6/2011 | Erofeev |
| 7,962,709 B2 | 6/2011 | Agrawal |
| 8,024,294 B2 | 9/2011 | Kottomtharayil |
| 8,046,334 B2 | 10/2011 | Hwang et al. |
| 8,121,983 B2 | 2/2012 | Prahlad et al. |
| 8,166,263 B2 | 4/2012 | Prahlad |
| 8,190,565 B2 | 5/2012 | Prahlad et al. |
| 8,204,859 B2 | 6/2012 | Ngo |
| 8,219,524 B2 | 7/2012 | Gokhale |
| 8,271,830 B2 | 9/2012 | Erofeev |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,645,320 B2 | 2/2014 | Prahlad et al. |
| 8,725,694 B2 | 5/2014 | Kottomtharayil |
| 8,789,208 B1 | 7/2014 | Sundaram et al. |
| 8,868,494 B2 | 10/2014 | Agrawal |
| 8,886,595 B2 | 11/2014 | Prahlad et al. |
| 9,002,785 B2 | 4/2015 | Prahlad et al. |
| 2001/0027457 A1 | 10/2001 | Yee |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0042222 A1 | 11/2001 | Kedem et al. |
| 2001/0044807 A1 | 11/2001 | Kleiman et al. |
| 2001/0044834 A1 | 11/2001 | Bradshaw et al. |
| 2002/0002557 A1 | 1/2002 | Straube et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0073070 A1 | 6/2002 | Morita et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0133511 A1 | 9/2002 | Hostetter et al. |
| 2002/0133512 A1 | 9/2002 | Milillo et al. |
| 2002/0152381 A1 | 10/2002 | Kuriya et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0018657 A1 | 1/2003 | Monday |
| 2003/0028736 A1* | 2/2003 | Berkowitz et al. ............ 711/162 |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0158834 A1 | 8/2003 | Sawdon et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dairymple et al. |
| 2004/0117572 A1 | 6/2004 | Welsh et al. |
| 2004/0139128 A1 | 7/2004 | Becker et al. |
| 2004/0143642 A1 | 7/2004 | Beckmann et al. |
| 2004/0148376 A1 | 7/2004 | Rangan et al. |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Armangau et al. |
| 2005/0027892 A1 | 2/2005 | McCabe et al. |
| 2005/0033800 A1 | 2/2005 | Kavuri et al. |
| 2005/0033878 A1 | 2/2005 | Pangal et al. |
| 2005/0080928 A1 | 4/2005 | Beverly et al. |
| 2005/0108292 A1 | 5/2005 | Burton et al. |
| 2005/0138306 A1 | 6/2005 | Panchbudhe et al. |
| 2005/0144202 A1 | 6/2005 | Chen |
| 2005/0187982 A1 | 8/2005 | Sato |
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0242371 A1 | 10/2006 | Shono et al. |
| 2006/0242489 A1 | 10/2006 | Brockway et al. |
| 2007/0043956 A1 | 2/2007 | El Far et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0143371 A1 | 6/2007 | Kottomtharayil |
| 2007/0143756 A1 | 6/2007 | Gokhale |

(56) References Cited

U.S. PATENT DOCUMENTS

| | | | |
|---|---|---|---|
| 2007/0179990 A1 | 8/2007 | Zimran et al. | |
| 2007/0183224 A1 | 8/2007 | Erofeev | |
| 2007/0185937 A1 | 8/2007 | Prahlad et al. | |
| 2007/0185938 A1* | 8/2007 | Prahlad et al. | 707/204 |
| 2007/0185939 A1 | 8/2007 | Prahlad et al. | |
| 2007/0185940 A1 | 8/2007 | Prahlad et al. | |
| 2007/0186068 A1* | 8/2007 | Agrawal | 711/162 |
| 2007/0198602 A1 | 8/2007 | Ngo et al. | |
| 2007/0226438 A1 | 9/2007 | Erofeev | |
| 2007/0244571 A1 | 10/2007 | Wilson et al. | |
| 2007/0283111 A1 | 12/2007 | Berkowitz et al. | |
| 2007/0288536 A1 | 12/2007 | Sen et al. | |
| 2007/0288711 A1 | 12/2007 | Chen et al. | |
| 2008/0016293 A1 | 1/2008 | Saika | |
| 2008/0028009 A1 | 1/2008 | Ngo | |
| 2008/0059515 A1 | 3/2008 | Fulton | |
| 2008/0103916 A1 | 5/2008 | Camarador et al. | |
| 2008/0183775 A1 | 7/2008 | Prahlad et al. | |
| 2008/0229037 A1 | 9/2008 | Bunte et al. | |
| 2008/0243914 A1 | 10/2008 | Prahlad et al. | |
| 2008/0243957 A1 | 10/2008 | Prahlad et al. | |
| 2008/0243958 A1 | 10/2008 | Prahlad et al. | |
| 2008/0244177 A1 | 10/2008 | Crescenti et al. | |
| 2008/0244205 A1 | 10/2008 | Amano et al. | |
| 2008/0306954 A1 | 12/2008 | Hornqvist | |
| 2009/0044046 A1 | 2/2009 | Yamasaki | |
| 2009/0070330 A1 | 3/2009 | Hwang et al. | |
| 2009/0150462 A1 | 6/2009 | McClanahan et al. | |
| 2009/0182963 A1 | 7/2009 | Prahlad et al. | |
| 2009/0187944 A1 | 7/2009 | White et al. | |
| 2009/0319534 A1 | 12/2009 | Gokhale | |
| 2009/0319585 A1 | 12/2009 | Gokhale | |
| 2010/0005259 A1 | 1/2010 | Prahlad | |
| 2010/0036931 A1 | 2/2010 | Certain et al. | |
| 2010/0049753 A1 | 2/2010 | Prahlad et al. | |
| 2010/0094808 A1 | 4/2010 | Erofeev | |
| 2010/0100529 A1* | 4/2010 | Erofeev | 707/610 |
| 2010/0122053 A1 | 5/2010 | Prahlad et al. | |
| 2010/0131461 A1 | 5/2010 | Prahlad et al. | |
| 2010/0145909 A1 | 6/2010 | Ngo | |
| 2010/0153338 A1 | 6/2010 | Ngo et al. | |
| 2010/0179941 A1 | 7/2010 | Agrawal et al. | |
| 2010/0205150 A1 | 8/2010 | Prahlad et al. | |
| 2011/0047340 A1 | 2/2011 | Olson et al. | |
| 2011/0066599 A1 | 3/2011 | Prahlad et al. | |
| 2011/0161300 A1 | 6/2011 | Hwang et al. | |
| 2011/0246416 A1 | 10/2011 | Prahlad et al. | |
| 2011/0246429 A1 | 10/2011 | Prahlad et al. | |
| 2011/0295804 A1 | 12/2011 | Erofeev | |
| 2011/0295806 A1 | 12/2011 | Erofeev | |
| 2012/0084523 A1* | 4/2012 | Littlefield et al. | 711/162 |
| 2012/0317074 A1 | 12/2012 | Ngo | |
| 2013/0006926 A1 | 1/2013 | Erofeev | |
| 2013/0006938 A1 | 1/2013 | Prahlad et al. | |
| 2013/0007183 A1 | 1/2013 | Sorenson et al. | |
| 2013/0238562 A1 | 9/2013 | Kumarasamy et al. | |
| 2014/0108351 A1 | 4/2014 | Nallathambi et al. | |
| 2014/0201150 A1 | 7/2014 | Kumarasamy et al. | |
| 2015/0095285 A1 | 4/2015 | Prahlad et al. | |
| 2015/0212893 A1 | 7/2015 | Pawar et al. | |
| 2015/0212894 A1 | 7/2015 | Pawar et al. | |
| 2015/0212895 A1 | 7/2015 | Pawar et al. | |
| 2015/0212896 A1 | 7/2015 | Pawar et al. | |
| 2015/0212897 A1 | 7/2015 | Kottomtharayil et al. | |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 02/095632 | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |

OTHER PUBLICATIONS

Arneson, "Development of Omniserver; Mass Storage Systems," Control Data Corporation, 1990, pp. 88-93.

Arneson, "Mass Storage Archiving in Network Environments" IEEE, 1998, pp. 45-50.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#1 of 2, pp. 646-655), Jim; Reuter, Andreas, Transaction Processing: Concepts and Techniques, Morgan Kaufmann Publisher, USA 1994, 1994, pp. 646-655.

Gray (#2 of 2, pp. 604-609), Jim; Reuter Andreas, Transaction Processing Concepts and Techniques, Morgan Kaufmann Publisher, USA 1994, pp. 604-609.

Harrington, Lisa H., "The RFP Process: How to Hire a Third Party", Transportation & Distribution, Sep. 1988, vol. 39, Issue 9, in 5 pages.

http://en.wikipedia.org/wiki/Naive_Bayes_classifier, printed on Jun. 1, 2010, in 7 pages.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Lyon J., Design considerations in replicated database systems for disaster protection, COMPCON 1988, Feb. 29, 1988, pp. 428-430.

Microsoft Corporation, "Microsoft Exchange Server: Best Practices for Exchange Database Management," 1998.

Rosenblum et al., "The Design and Implementation of a Log-Structure File System," Operating Systems Review SIGOPS, vol. 25, No. 5, New York, US, pp. 1-15 (May 1991).

The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.

Veritas Software Corporation, "Veritas Volume Manager 3.2, Administrator's Guide," Aug. 2001, 360 pages.

Wiesmann M, Database replication techniques: a three parameter classification, Oct. 16, 2000, pp. 206-215.

(56) References Cited

OTHER PUBLICATIONS

Examiner's Report for Australian Application No. 2003279847, Dated Dec. 9, 2008, 4 pages.
European Examination Report; Application No. 06848901.2, Apr. 1, 2009, pp. 7.
Examiner's First Report; Application No. 2006331932 May 11, 2011 in 2 pages.
International Search Report dated Dec. 28, 2009, PCT/US2004/038324.
Canadian Office Action dated Dec. 10, 2009, Application No. CA2544063.
Canadian Office Action dated Dec. 29, 2010, Application No. CA2546304.
First Office Action in Indian Application No. 3359/DELNP/2006 dated Feb. 11, 2013.
Final Office Action for Japanese Application No. 2003531581, Mail Date Mar. 24, 2009, 6 pages.
First Office Action for Japanese Application No. 2003531581, Mail Date Jul. 8, 2008, 8 pages.
International Preliminary Report on Patentability, PCT Application No. PCT/US2009/066880, mailed Jun. 23, 2011, in 9 pages.
International Search Report and Written Opinion dated Jan. 11, 2006, PCT/US2004/038455.
International Search Report and Written Opinion dated Mar. 25, 2010, PCT/US2009/066880.
International Search Report and Written Opinion dated Nov. 13, 2009, PCT/US2007/081681.
International Search Report and Written Opinion issued in PCT Application No. PCT/US2011/030396, mailed Jul. 18, 2011, in 20 pages.
International Search Report and Written Opinion issued in PCT Application No. PCT/US2011/38436, mailed Sep. 21, 2011, in 18 pages.
International Search Report from International Application No. PCT/US2006/048273, dated May 15, 2007.
Second Examination Report in EU Appl. No. 06 848 901.2-2201 dated Dec. 3, 2010.

\* cited by examiner

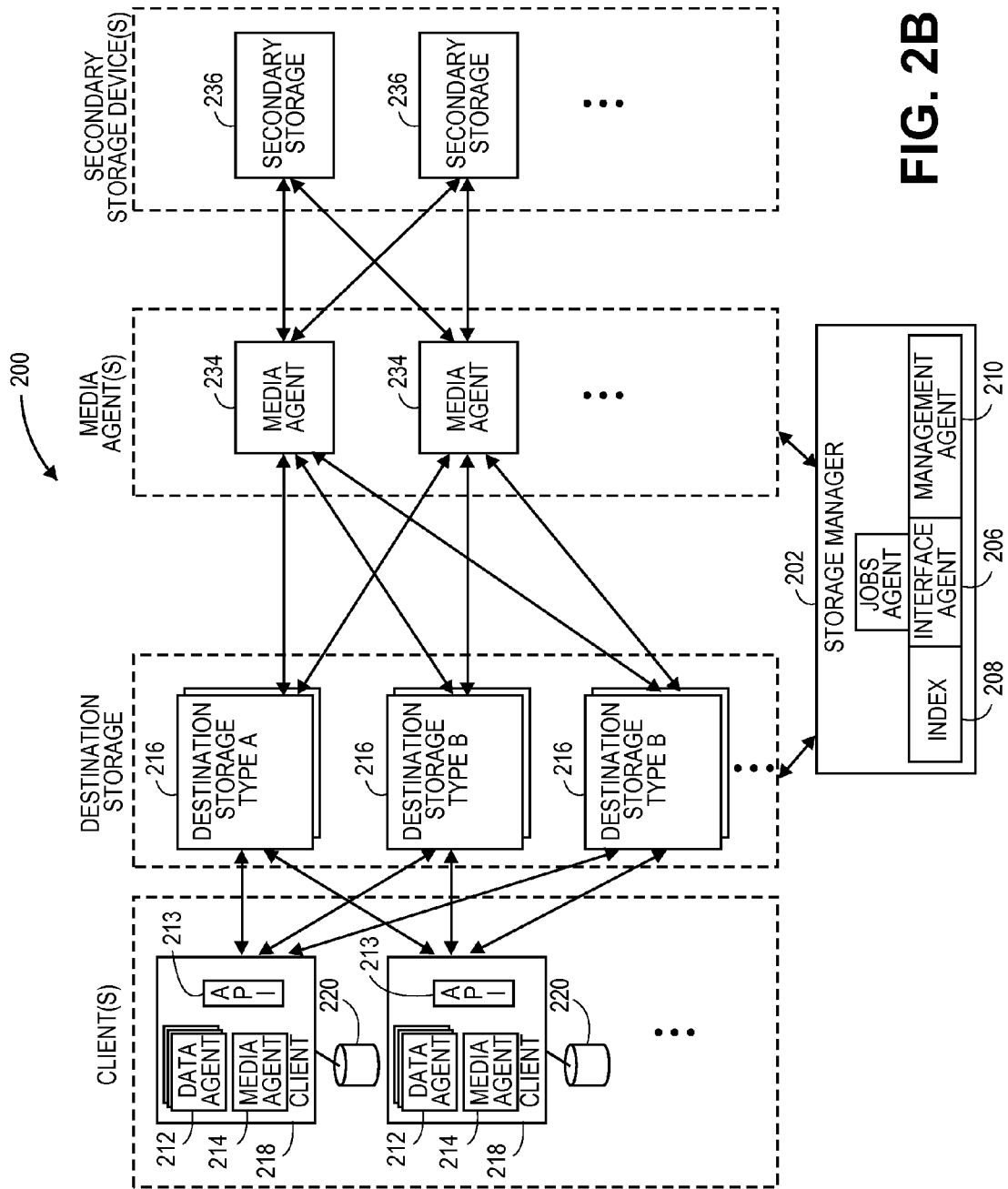

INTEGRATED SNAPSHOT INTERFACE FOR A DATA STORAGE SYSTEM

INCORPORATION BY REFERENCE TO RELATED APPLICATIONS

Any and all priority claims identified in the Application Data Sheet, or any correction thereto, are hereby incorporated by reference under 37 CFR 1.57.

This application claims the benefit of priority under 35 U.S.C. §119(e) of U.S. Provisional Patent Application No. 61/637,208, filed on Apr. 23, 2012, and entitled "INTEGRATED SNAPSHOT INTERFACE FOR A DATA STORAGE SYSTEM," the disclosure of which is hereby incorporated by reference in its entirety.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, improved data presentation and access features, and the like, are in increasing demand.

SUMMARY

Snapshot technology and management can vary by storage platform, which can lead to significant administrative burden. For instance, it can be desirable to integrate a variety of hardware storage devices (e.g., disk arrays) with data storage and management software. This allows users to exploit the functionality of the data management software. For instance, some data storage and management systems described herein provide policy-based data protection functions (e.g., backup, archiving, replication, migration, restore, etc.) in an application-consistent manner. However, integrating a selected storage product (e.g., storage hardware such as a hardware snapshot-capable storage array) with such data management software often involves extensive customized scripting, monitoring and maintenance, resulting in added complexity and cost.

Some data storage and management systems provide customized, built-in support for selected hardware storage products and corresponding snapshot or other functionality. However, given the large number of vendors and associated products, incorporating this type of customized, built-in support provides a limited solution.

A data storage system according to certain embodiments includes a host computing device in communication with a first storage device of a first type, the first storage device configured to perform snapshot operations. The system can includes at least one software application executing on a host computing device and generating production data. The system includes a snapshot management module executing on one or more processors and configured to: receive a request to perform a snapshot operation involving a stored version of at least a portion of the production data that resides on the first storage device; process the request to identify one or more functions for performing the requested snapshot operation and that are defined at least in part by a programming interface specification; and invoke instances of the one or more identified functions that are in compliance with the programming interface specification and are implemented specifically for storage devices of the first type. A snapshot engine residing on the first storage device is responsive to the invoking of the instances of the one or more identified functions to perform the requested snapshot operation.

According to certain aspects, a method is provided for performing one or more snapshot operations on production data generated in a data storage system. The method can include receiving a request to perform a snapshot operation involving a stored version of at least a portion of production data that resides on a first storage device of a first type, the production data generated by at least one software application executing on a host computing device that is in communication with the first storage device, the first storage device configured to perform snapshot operations. The method can also include processing the request using one or more computer processors to identify one or more functions for performing the requested snapshot operation and that are defined at least in part by a programming interface specification. The method further includes invoking, using one or more computer processors, instances of the one or more identified functions that are in compliance with the programming interface specification and are implemented specifically for storage devices of the first type. A snapshot engine residing on the first storage device is responsive to the invoking of the instances of the one or more identified functions to perform the requested snapshot operation.

BRIEF DESCRIPTION OF THE DRAWINGS

FIGS. 2A-2B illustrate example data storage systems implementing a common snapshot interface in accordance with certain embodiments.

DETAILED DESCRIPTION

Figure 1A:
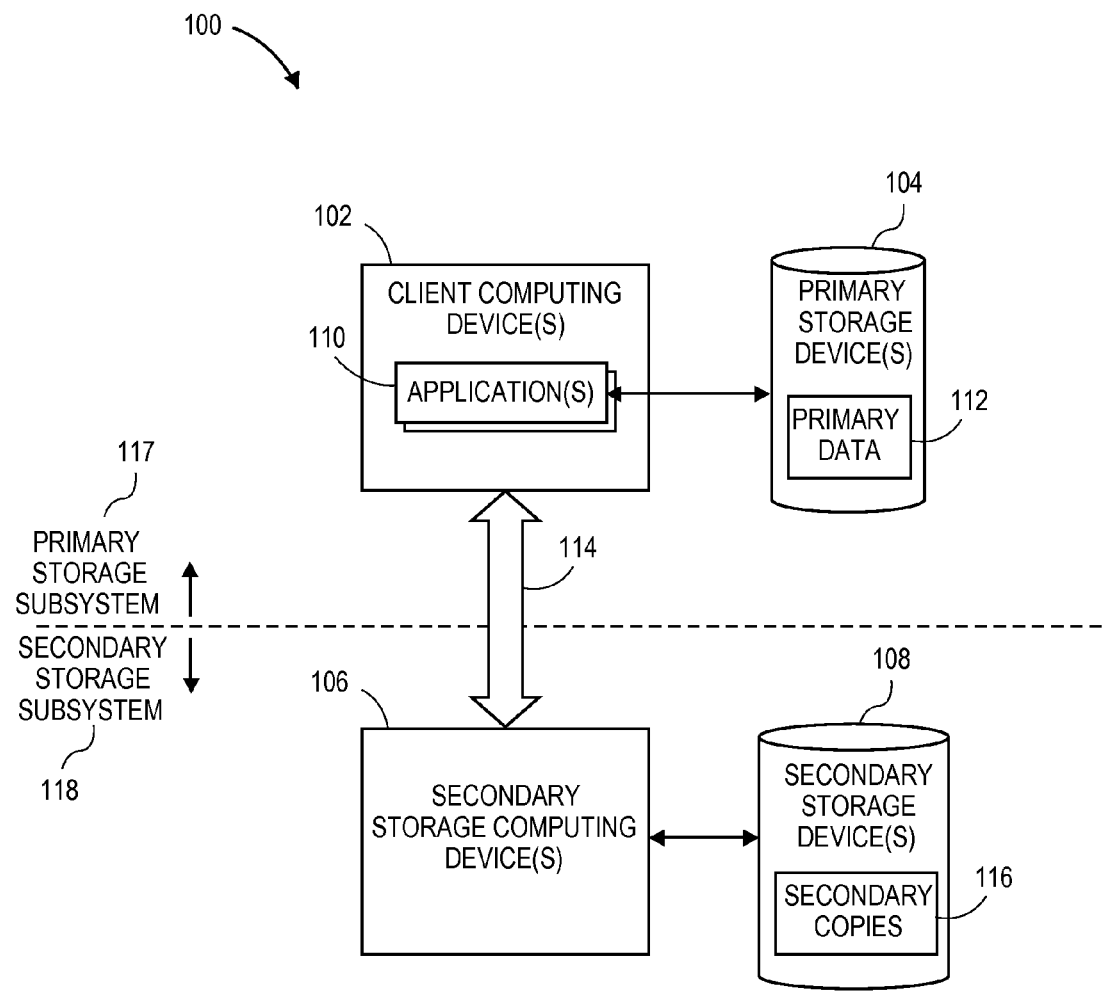
FIG. 1A is a block diagram illustrating an exemplary information management system.

In response to the foregoing challenges, certain embodiments described herein include data storage systems capable of supporting a wide variety of hardware storage devices, including products provided by multiple vendors. And these data storage systems support using an integrated, single-platform architecture. In some cases, the data storage system provides a generic snapshot interface, allowing for integration with a wide variety of snapshot-capable storage devices.

The generic interface can be a programming interface (e.g., an application programming interface [API]). Using the snapshot interface, storage device vendors can integrate their particular snapshot technology with the data storage system. For instance, the data storage system can access a shared library of functions (e.g., a dynamically linked library [DLL]) provided by the vendor (or another by appropriate entity) that complies with the specifications of the common programming interface. And by invoking the appropriate functions in the library, the data storage system performs the snapshot operation on the storage device.

In this manner, users can exploit the advantages of the data storage system (e.g., policy-based, application-consistent data management and protection) with generally any type of snapshot-capable storage device.

Moreover, because vendors are generally experts regarding the underlying implementation of their respective snapshot-capable products, they are well-suited to develop the library. Thus, the task of implementing the library instances for the particular storage devices can be distributed to a large number of expert parties, such as the vendors. In these and other manners, the generic interface allows the data storage system to support a large number of different snapshot products in an efficient and scalable manner.

In some embodiments, the data storage system includes built-in functionality for interacting with a first group of one or more types of snapshot devices, and the generic interface provides compatibility with a second group of one or more types of snapshot devices.

Systems and methods are described herein for implementing an integrated snapshot interface in a data storage system. Examples of such systems and methods are discussed in further detail herein, e.g., with respect to FIGS. 2-4. An integrated snapshot interface may additionally be implemented by information management systems such as those that will now be described with respect to FIGS. 1A-1E. And, as will be described, the componentry for implementing the integrated snapshot interface described herein can be incorporated into and implemented by such systems.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions have been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. Pub. No. 2010-0332456, entitled "DATA OBJECT STORE AND SERVER FOR A CLOUD STORAGE ENVIRONMENT, INCLUDING DATA DEDUPLICATION AND DATA MANAGEMENT ACROSS MULTIPLE CLOUD STORAGE SITES";
- U.S. Pat. No. 7,035,880, entitled "MODULAR BACKUP AND RETRIEVAL SYSTEM USED IN CONJUNCTION WITH A STORAGE AREA NETWORK";
- U.S. Pat. No. 7,343,453, entitled "HIERARCHICAL SYSTEMS AND METHODS FOR PROVIDING A UNIFIED VIEW OF STORAGE INFORMATION";
- U.S. Pat. No. 7,395,282, entitled "HIERARCHICAL BACKUP AND RETRIEVAL SYSTEM";
- U.S. Pat. No. 7,246,207, entitled "SYSTEM AND METHOD FOR DYNAMICALLY PERFORMING STORAGE OPERATIONS IN A COMPUTER NETWORK";
- U.S. Pat. No. 7,747,579, entitled "METABASE FOR FACILITATING DATA CLASSIFICATION";
- U.S. Pat. No. 8,229,954, entitled "MANAGING COPIES OF DATA";
- U.S. Pat. No. 7,617,262, entitled "SYSTEM AND METHODS FOR MONITORING APPLICATION DATA IN A DATA REPLICATION SYSTEM";
- U.S. Pat. No. 7,529,782, entitled "SYSTEM AND METHODS FOR PERFORMING A SNAPSHOT AND FOR RESTORING DATA";
- U.S. Pat. No. 8,230,195, entitled "SYSTEM AND METHOD FOR PERFORMING AUXILIARY STORAGE OPERATIONS";
- U.S. Pat. No. 8,364,652, entitled "CONTENT-ALIGNED, BLOCK-BASED DEDUPLICATION";
- U.S. Pat. Pub. No. 2006/0224846, entitled "SYSTEM AND METHOD TO SUPPORT SINGLE INSTANCE STORAGE OPERATIONS";
- U.S. Pat. Pub. No. 2009/0329534, entitled "APPLICATION-AWARE AND REMOTE SINGLE INSTANCE DATA MANAGEMENT";
- U.S. Pat. Pub. No. 2012/0150826, entitled "DISTRIBUTED DEDUPLICATED STORAGE SYSTEM";

U.S. Pat. Pub. No. 2012/0150818, entitled "CLIENT-SIDE REPOSITORY IN A NETWORKED DEDUPLICATED STORAGE SYSTEM";

U.S. Pat. No. 8,170,995, entitled "METHOD AND SYSTEM FOR OFFLINE INDEXING OF CONTENT AND CLASSIFYING STORED DATA"; and U.S. Pat. No. 8,156,086, entitled "SYSTEMS AND METHODS FOR STORED DATA VERIFICATION".

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117.

Depending on the context, the term "information management system" can refer to generally all of the illustrated hardware and software components. Or, in other instances, the term may refer to only a subset of the illustrated components.

For instance, in some cases information management system 100 generally refers to a combination of specialized components used to protect, move, manage, manipulate and/or process data and metadata generated by the client computing devices 102. However, the term may generally not refer to the underlying components that generate and/or store the primary data 112, such as the client computing devices 102 themselves, the applications 110 and operating system residing on the client computing devices 102, and the primary storage devices 104.

As an example, "information management system" may sometimes refer only to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include, without limitation, one or more: workstations, personal computers, desktop computers, or other types of generally fixed computing systems such as mainframe computers and minicomputers.

The client computing devices 102 can also include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc.

In some cases, each client computing device 102 is associated with one or more users and/or corresponding user accounts, of employees or other individuals.

The term "client computing device" is used herein because the information management system 100 generally "serves" the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

The client computing devices 102 may additionally include virtualized and/or cloud computing resources. For instance, one or more virtual machines may be provided to the organization by a third-party cloud service vendor. Or, in some embodiments, the client computing devices 102 include one or more virtual machine(s) running on a virtual machine host computing device operated by the organization. As one example, the organization may use one virtual machine as a database server and another virtual machine as a mail server. A virtual machine manager (VMM) (e.g., a Hypervisor) may manage the virtual machines, and reside and execute on the virtual machine host computing device.

Each client computing device 102 may have one or more applications 110 (e.g., software applications) executing thereon which generate and manipulate the data that is to be protected from loss.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The applications 110 can include at least one operating system (e.g., Microsoft Windows, Mac OS X, iOS, IBM z/OS, Linux, other Unix-based operating systems, etc.), which may support one or more file systems and host the other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is stored on the primary storage device(s) 104 and is organized via a file system supported by the client computing device 102. For instance, the client computing device(s) 102 and corresponding applications 110 may create, access, modify, write, delete, and otherwise use primary data 112.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to break the primary data 112 up into units of different granularities. In general, primary data 112 can include files, directories, file system volumes, data blocks, extents, or any other types or granularities of data objects. As used herein, a "data object" can refer to both (1) any file that is currently addressable by a file system or that was previously addressable by the file system (e.g., an archive file) and (2) a subset of such a file.

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), frequency of change (e.g., a period in which the data object is modified), business unit (e.g., a group or department that generates, manages or is otherwise associated with the data object), and aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the like.

In addition to metadata generated by or related to file systems and operating systems, some of the applications 110 maintain indices of metadata for data objects, e.g., metadata associated with individual email messages. Thus, each data object may be associated with corresponding metadata. The use of metadata to perform classification and other functions is described in greater detail below.

Each of the client computing devices 102 are associated with and/or in communication with one or more of the primary storage devices 104 storing corresponding primary data 112. A client computing device 102 may be considered to be "associated with" or "in communication with" a primary storage device 104 if it is capable of one or more of: storing data to the primary storage device 104, retrieving data from the primary storage device 104, and modifying data retrieved from a primary storage device 104.

The primary storage devices 104 can include, without limitation, disk drives, hard-disk arrays, semiconductor memory (e.g., solid state drives), and network attached storage (NAS) devices. In some cases, the primary storage devices 104 form part of a distributed file system. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing devices 102. For instance, a primary storage device 104 in one embodiment is a local disk drive of a corresponding client computing device 102. In other cases, one or more primary storage devices 104 can be shared by multiple client computing devices 102. As one example, a primary storage device 104 can be a disk array shared by a group of client computing devices 102, such as one of the following types of disk arrays: EMC Clarion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112. Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may be referred to in some cases as a secondary storage subsystem 118.

Creation of secondary copies 116 can help meet information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

Types of secondary copy operations can include, without limitation, backup operations, archive operations, snapshot operations, replication operations (e.g., continuous data replication [CDR]), data retention policies such as information lifecycle management and hierarchical storage management operations, and the like. These specific types operations are discussed in greater detail below.

Regardless of the type of secondary copy operation, the client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also often stored on a secondary storage device 108 that is inaccessible to the applications 110 running on the client computing devices 102 (and/or hosted services). Some secondary copies 116 may be "offline copies," in that they are not readily available (e.g. not mounted to tape or disk). Offline copies can include copies of data that the information management system 100 can access without human intervention (e.g. tapes within an automated tape library, but not yet mounted in a drive), and copies that the information management system 100 can access only with at least some human intervention (e.g. tapes located at an offsite storage site).

The secondary storage devices 108 can include any suitable type of storage device such as, without limitation, one or more tape libraries, disk drives or other magnetic, non-tape storage devices, optical media storage devices, solid state storage devices, NAS devices, combinations of the same, and the like. In some cases, the secondary storage devices 108 are provided in a cloud (e.g. a private cloud or one operated by a third-party vendor).

The secondary storage device(s) 108 in some cases comprises a disk array or a portion thereof. In some cases, a single storage device (e.g., a disk array) is used for storing both primary data 112 and at least some secondary copies 116. In one example, a disk array capable of performing hardware snapshots stores primary data 112 and creates and stores hardware snapshots of the primary data 112 as secondary copies 116.

The Use of Intermediary Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediary components can provide other benefits. For instance, as discussed further below with respect to FIG. 1D, distributing some of the work involved in creating secondary copies 116 can enhance scalability.

The intermediary components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any appropriate type of computing device and can include, without limitation, any of the types of fixed and portable computing devices described above with respect to the client computing devices 102. In some cases, the secondary storage computing device(s) 106 include specialized hardware and/or software componentry for interacting with the secondary storage devices 108.

To create a secondary copy 116, the client computing device 102 communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections).

Exemplary Primary Data and an Exemplary Secondary Copy

Figure 1B:
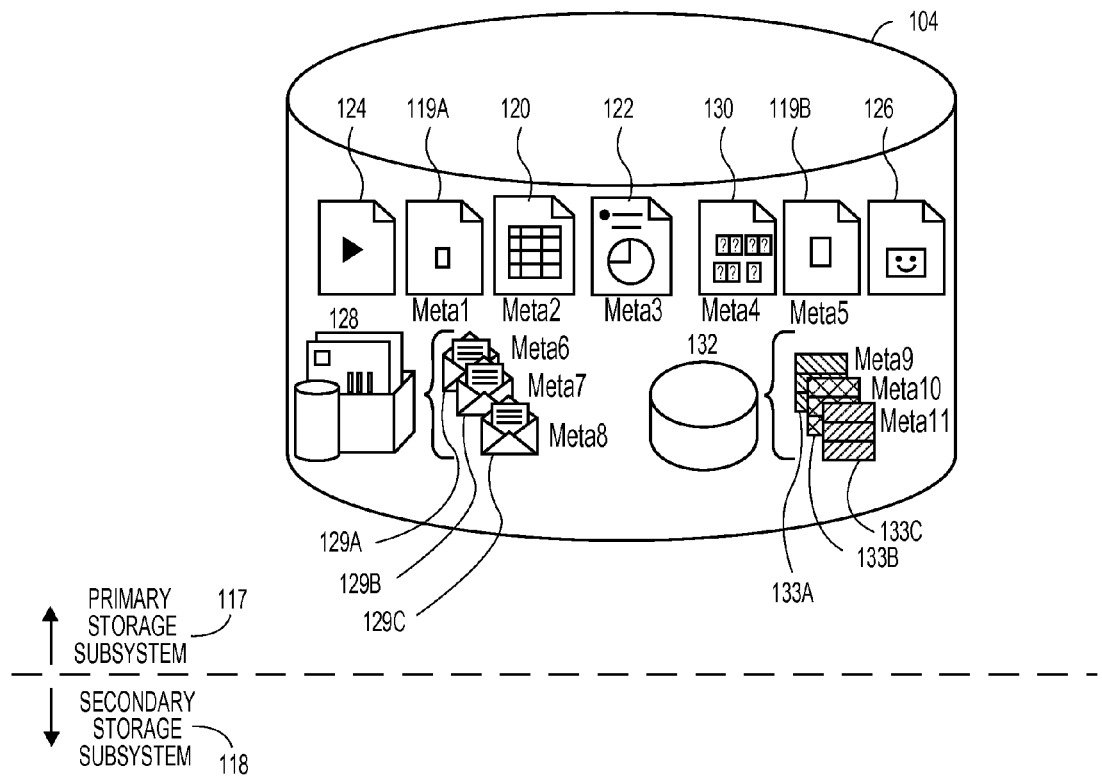
FIG. 1B is a detailed view of a primary storage device, a secondary storage device, and some examples of primary data and secondary copy data.
Figure 1B:
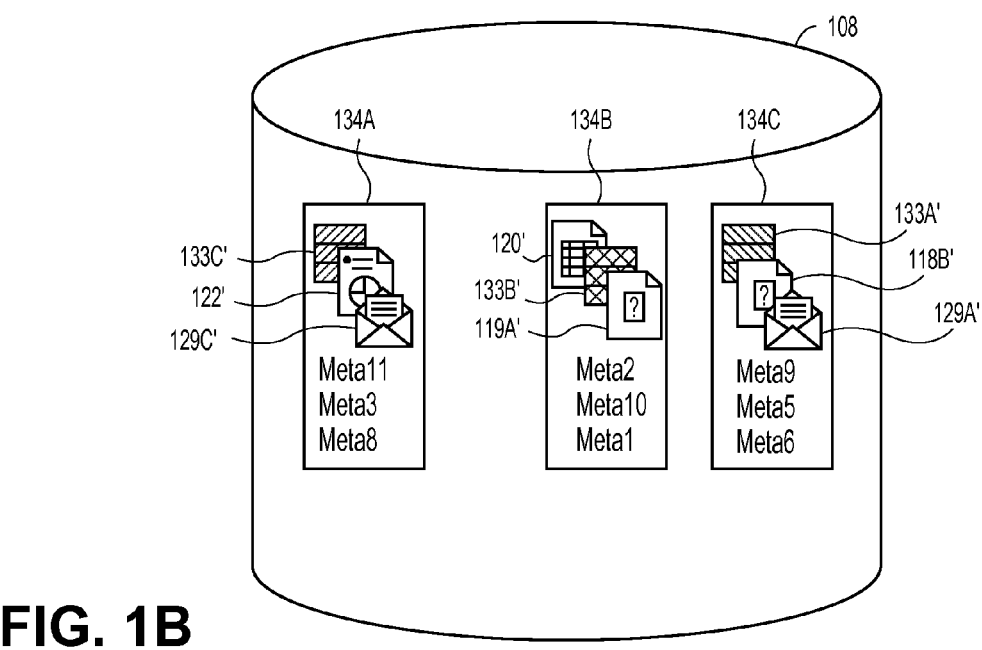

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables 133A-133C).

Some or all primary data objects are associated with a primary copy of object metadata (e.g., "Metal-11"), which may be file system metadata and/or application specific metadata. Stored on the secondary storage device(s) 108 are secondary copy objects 134A-C which may include copies of or otherwise represent corresponding primary data objects and metadata.

As shown, the secondary copy objects 134A-C can individually represent more than one primary data object. For example, secondary copy data object 134A represents three separate primary data objects 133C, 122 and 129C (represented as 133C', 122' and 129C', respectively). Moreover, as indicated by the prime mark ('), a secondary copy object may store a representation of a primary data object or metadata differently than the original format, e.g., in a compressed, encrypted, deduplicated, or other modified format.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 1C:
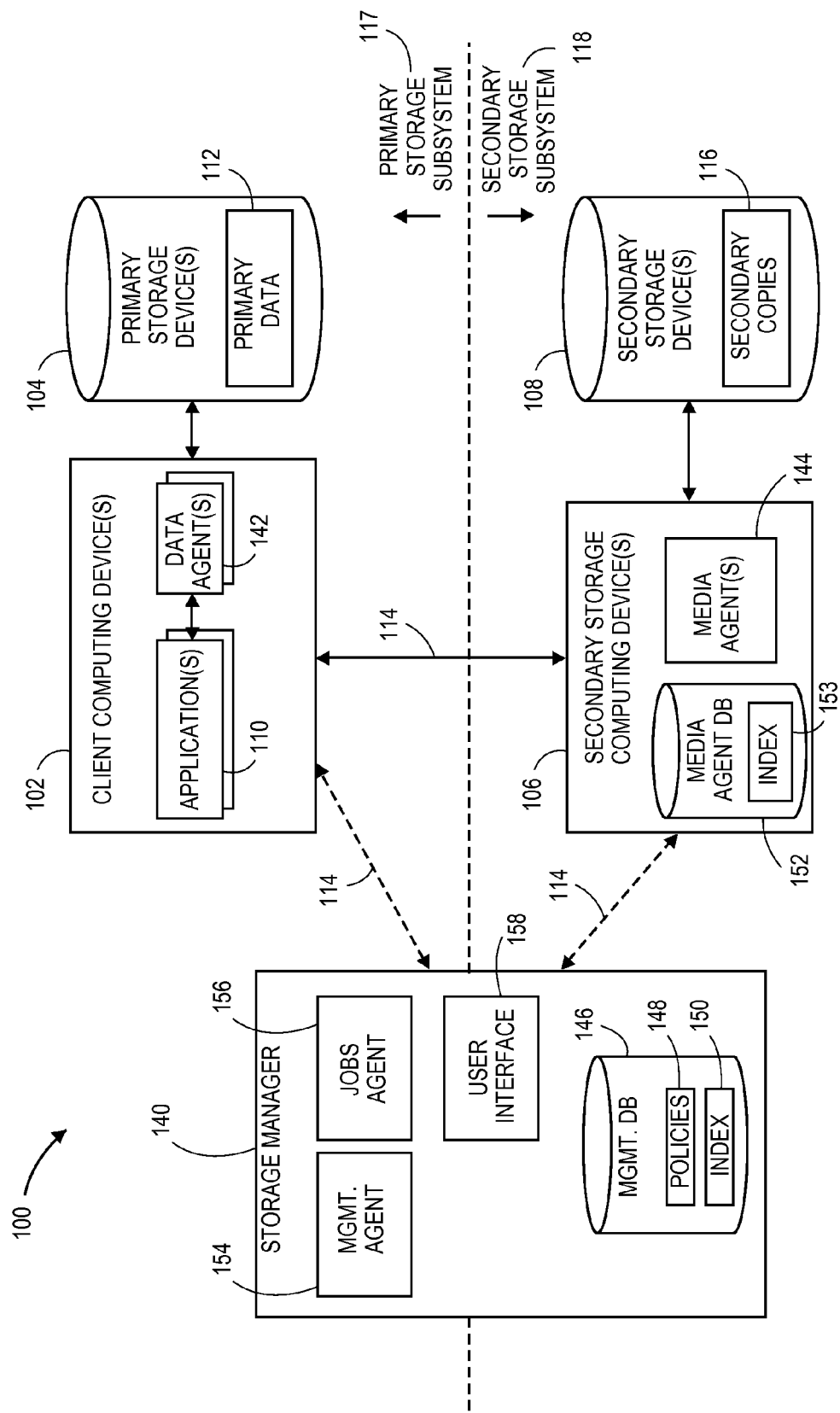
FIG. 1C is a block diagram of an exemplary information management system including a storage manager, one or more data agents, and one or more media agents.

FIG. 1C shows an information management system 100 designed according to these considerations and which includes: a central storage or information manager 140 configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a host computing device can be selected to best suit the functions of the storage manager 140. These and other advantages are described in further detail below with respect to FIG. 1D.

The storage manager 140 may be a software module or other application. The storage manager generally initiates, coordinates and/or controls storage and other information management operations performed by the information management system 100, e.g., to protect and control the primary data 112 and secondary copies 116 of data and metadata.

As shown by the dashed, arrowed lines, the storage manager 140 may communicate with and/or control some or all elements of the information management system 100, such as the data agents 142 and media agents 144. Thus, in certain embodiments, control information originates from the storage manager 140, whereas payload data and metadata is generally communicated between the data agents 142 and the media agents 144 (or otherwise between the client computing device(s) 102 and the secondary storage computing device(s) 106), e.g., at the direction of the storage manager 140. In other embodiments, some information management operations are controlled by other components in the information management system 100 (e.g., the media agent(s) 144 or data agent(s) 142), instead of or in combination with the storage manager 140.

According to certain embodiments, the storage manager provides one or more of the following functions:

initiating execution of secondary copy operations;
    managing secondary storage devices 108 and inventory/capacity of the same;
    allocating secondary storage devices 108 for secondary storage operations;
    monitoring completion of and providing status reporting related to secondary storage operations;
    tracking age information relating to secondary copies 116, secondary storage devices 108, and comparing the age information against retention guidelines;
    tracking movement of data within the information management system 100;
    tracking logical associations between components in the information management system 100;

protecting metadata associated with the information management system 100; and implementing operations management functionality.

The storage manager 140 may maintain a database 146 of management-related data and information management policies 148. The database 146 may include a management index 150 or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108.

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface through which users and system processes can retrieve information about the status of information management operations (e.g., storage operations) or issue instructions to the information management system 100 and its constituent components.

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

In general, the management agent 154 allows multiple information management systems 100 to communicate with one another. For example, the information management system 100 in some cases may be one information management subsystem or "cell" of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. No. 7,035,880, which is incorporated by reference herein.

Data Agents

As discussed, a variety of different types of applications 110 can reside on a given client computing device 102, including operating systems, database applications, e-mail applications, and virtual machines, just to name a few. And, as part of the as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, e.g., encryption and deduplication.

As indicated, each data agent 142 may be specialized for a particular application 110, and the system can employ multiple data agents 142, each of which may backup, migrate, and recover data associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediary components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108.

Media agents 144 can comprise logically and/or physically separate nodes in the information management system 100 (e.g., separate from the client computing devices 102, storage manager 140, and/or secondary storage devices 108). In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, and coordinating the retrieval of data from a particular secondary storage device 108.

While media agent(s) 144 are generally associated with one or more secondary storage devices 108, the media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

In operation, a media agent 144 associated with a particular secondary storage device 108 may instruct the secondary storage device 108 (e.g., a tape library) to use a robotic arm or other retrieval means to load or eject a certain storage media, and to subsequently archive, migrate, or retrieve data to or from that media, e.g., for the purpose of restoring the data to a client computing device 102. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In one configuration, a storage manager index 150 or other data structure may store data associating a client computing device 102 with a particular media agent 144 and/or secondary storage device 108, as specified in a storage policy. A media agent index 153 or other data structure associated with the particular media agent 144 may in turn include information about the stored data.

For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153.

Because the index 153 maintained in the database 152 may operate as a cache, it can also be referred to as an index cache. In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the storage management database 146 is relatively large, the management database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
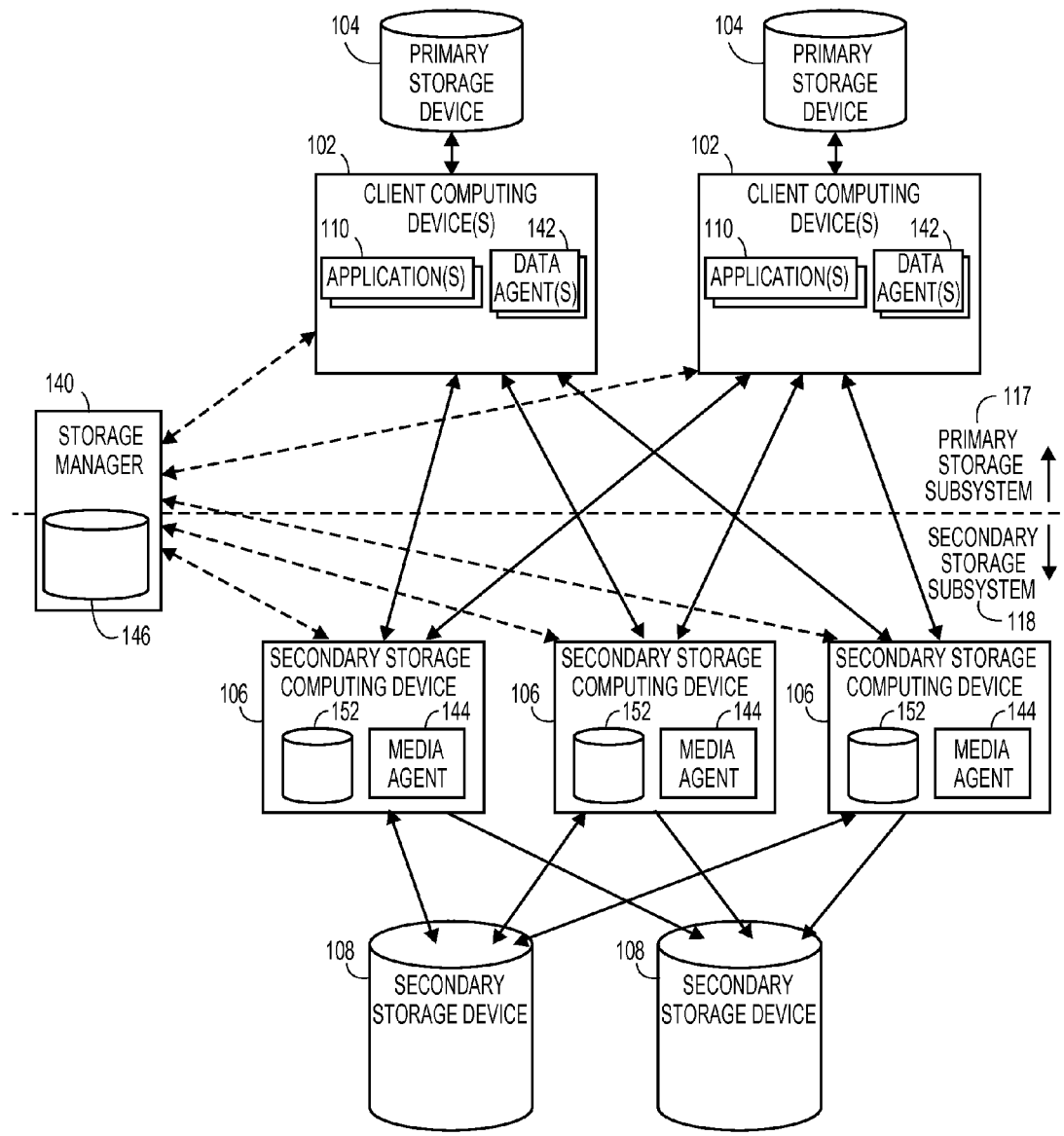
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage devices 106 (and corresponding media agents 144), and/or secondary storage devices 108. Moreover, each client computing device 102 in some embodiments can communicate with any of the media agents 144, e.g., as directed by the storage manager 140. And each media agent 144 may be able to communicate with any of the secondary storage devices 108, e.g., as directed by the storage manager 140. Thus, operations can be routed to the secondary storage devices 108 in a dynamic and highly flexible manner. Further examples of scalable systems capable of dynamic storage operations are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, and management operations.

Data Movement Operations

Data movement operations according to certain embodiments are generally operations that involve the copying or migration of data (e.g., payload data) between different locations in the information management system 100. For example, data movement operations can include operations in which stored data is copied, migrated, or otherwise transferred from primary storage device(s) 104 to secondary storage device(s) 108, from secondary storage device(s) 108 to different secondary storage device(s) 108, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication operations, single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of primary data 112 at a particular point in time. Each subsequent backup copy may be maintained independently of the first. Further, a backup copy in some embodiments is stored in a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the file-level, e.g., where the information management system 100 generally tracks changes to files at the file-level, and includes copies of files in the backup copy. In other cases, block-level backups are employed, where files are broken into constituent blocks, and changes are tracked at the block-level. Upon restore, the information management system 100 reassembles the blocks into files in a transparent fashion.

Far less data may actually be transferred and copied to the secondary storage devices 108 during a block-level copy than during a file-level copy, resulting in faster execution times. However, when restoring a block-level copy, the process of locating constituent blocks can sometimes result in longer restore times as compared to file-level backups. Similar to backup operations, the other types of secondary copy operations described herein can also be implemented at either the file-level or the block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies.

Snapshot Operations

Snapshot operations can provide a relatively lightweight, efficient mechanism for protecting data. From an end-user viewpoint, a snapshot may be thought of as an "instant" image of the primary data 112 at a given point in time. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Some types of snapshots do not actually create another physical copy of all the data as it existed at the particular point in time, but may simply create pointers that are able to map files and directories to specific memory locations (e.g., disk blocks) where the data resides, as it existed at the particular point in time. For example, a snapshot copy may include a set of pointers derived from the file system or an application. Each pointer points to a respective stored data block, so collectively, the set of pointers reflect the storage location and state of the data object (e.g., file(s) or volume(s) or data set(s)) at a particular point in time when the snapshot copy was created.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage. The snapshot mapping of file system data is also updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication, which is useful to reduce the amount of data within the system. For instance, some or all of the above-described secondary storage operations can involve deduplication in some fashion. New data is read, broken down into blocks (e.g., sub-file level blocks) of a selected granularity, compared with blocks that are already stored, and only the new blocks are stored. Blocks that already exist are represented as pointers to the already stored data.

In order to stream-line the comparison process, the information management system 100 may calculate and/or store signatures (e.g., hashes) corresponding to the individual data blocks and compare the hashes instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy. Moreover, single-instancing in some cases is distinguished from deduplication as a process of analyzing and reducing data at the file level, rather than the sub file level.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. Pub. No. 2012/0084269, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Deduplication can also be performed on the "source-side" (or "client-side"), e.g., to reduce the amount of traffic between the media agents 144 and the client computing device(s) 102 and/or reduce redundant data stored in the primary storage devices 104. Examples of such deduplication techniques are provided in U.S. Pat. Pub. No. 2012/0150818, which is incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies".

Auxiliary Copy and Disaster Recovery Operations

An auxiliary copy is generally a copy operation in which a copy is created of an existing secondary copy 116. For instance, an initial or "primary" secondary copy 116 may be generated using or otherwise be derived from primary data 112, whereas an auxiliary copy is generated from the initial secondary copy 116. Auxiliary copies can be used to create additional standby copies of data and may reside on different secondary storage devices 108 than initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Processing and Manipulation Operations

As indicated, the information management system 100 can also be configured to implement certain data manipulation operations, which according to certain embodiments are generally operations involving the processing or modification of stored data. Some data manipulation operations include content indexing operations and classification operations can be useful in leveraging the data under management to provide enhanced search and other features. Other data manipulation operations such as compression and encryption can provide data reduction and security benefits, respectively.

Data manipulation operations can be different than data movement operations in that they do not necessarily involve the copying, migration or other transfer of data (e.g., primary data 112 or secondary copies 116) between different locations in the system. For instance, data manipulation operations may involve processing (e.g., offline processing) or modification of already stored primary data 112 and/or secondary copies 116. However, in some embodiments data manipulation operations are performed in conjunction with data movement operations. As one example, the information management system 100 may encrypt data while performing an archive operation.

Content Indexing

In some embodiments, the information management system 100 "content indexes" data stored within the primary data 112 and/or secondary copies 116, providing enhanced search capabilities for data discovery and other purposes. The content indexing can be used to identify files or other data objects having pre-defined content (e.g., user-defined keywords or phrases), metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

Classification Operations—Metabase

In order to help leverage the data stored in the information management system 100, one or more components can be configured to scan data and/or associated metadata for classification purposes to populate a metabase of information. Such scanned, classified data and/or metadata may be included in a separate database and/or on a separate storage device from primary data 112 (and/or secondary copies 116), such that metabase related operations do not significantly impact performance on other components in the information management system 100.

In other cases, the metabase(s) may be stored along with primary data 112 and/or secondary copies 116. Files or other data objects can be associated with user-specified identifiers (e.g., tag entries) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies. In yet further embodiments, the secondary storage devices 108 can implement built-in, high performance hardware encryption.

Management Operations

Certain embodiments leverage the integrated, ubiquitous nature of the information management system 100 to provide useful system-wide management functions. As two non-limiting examples, the information management system 100 can be configured to implement operations management and e-discovery functions.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

Such information can be provided to users via the user interface 158 in a single, integrated view. For instance, the integrated user interface 158 can include an option to show a "virtual view" of the system that graphically depicts the various components in the system using appropriate icons. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

In some cases the information management system 100 alerts a user such as a system administrator when a particular resource is unavailable or congested. For example, a particular primary storage device 104 or secondary storage device 108 might be full or require additional capacity. Or a component may be unavailable due to hardware failure, software problems, or other reasons. In response, the information management system 100 may suggest solutions to such problems when they occur (or provide a warning prior to occurrence). For example, the storage manager 140 may alert the user that a secondary storage device 108 is full or otherwise congested. The storage manager 140 may then suggest, based on job and data storage information contained in its database 146, an alternate secondary storage device 108.

Other types of corrective actions may include suggesting an alternate data path to a particular primary or secondary storage device 104, 108, or dividing data to be stored among various available primary or secondary storage devices 104, 108 as a load balancing measure or to otherwise optimize storage or retrieval time. Such suggestions or corrective actions may be performed automatically, if desired. Further examples of some compatible operations management techniques and of interfaces providing an integrated view of an information management system are provided in U.S. Pat. No. 7,343,453, which is incorporated by reference herein. In some embodiments, the storage manager 140 implements the operations management functions described herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a logical container that defines (or includes information sufficient to determine) one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

Data associated with a storage policy can be logically organized into groups, which can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data.

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular sub-clients, client computing device 102, and the like. In one configuration, a separate scheduling policy is maintained for particular sub-clients on a client computing device 102. The scheduling policy specifies that those sub-clients are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when a data agent(s) 142 is installed on a client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g. "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how clients 102 (or groups thereof) may utilize system resources, such as available storage on cloud storage and/or network bandwidth. A provisioning policy specifies, for example, data quotas for particular client computing devices 102 (e.g. a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of secondary copy 116 and/or secondary copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
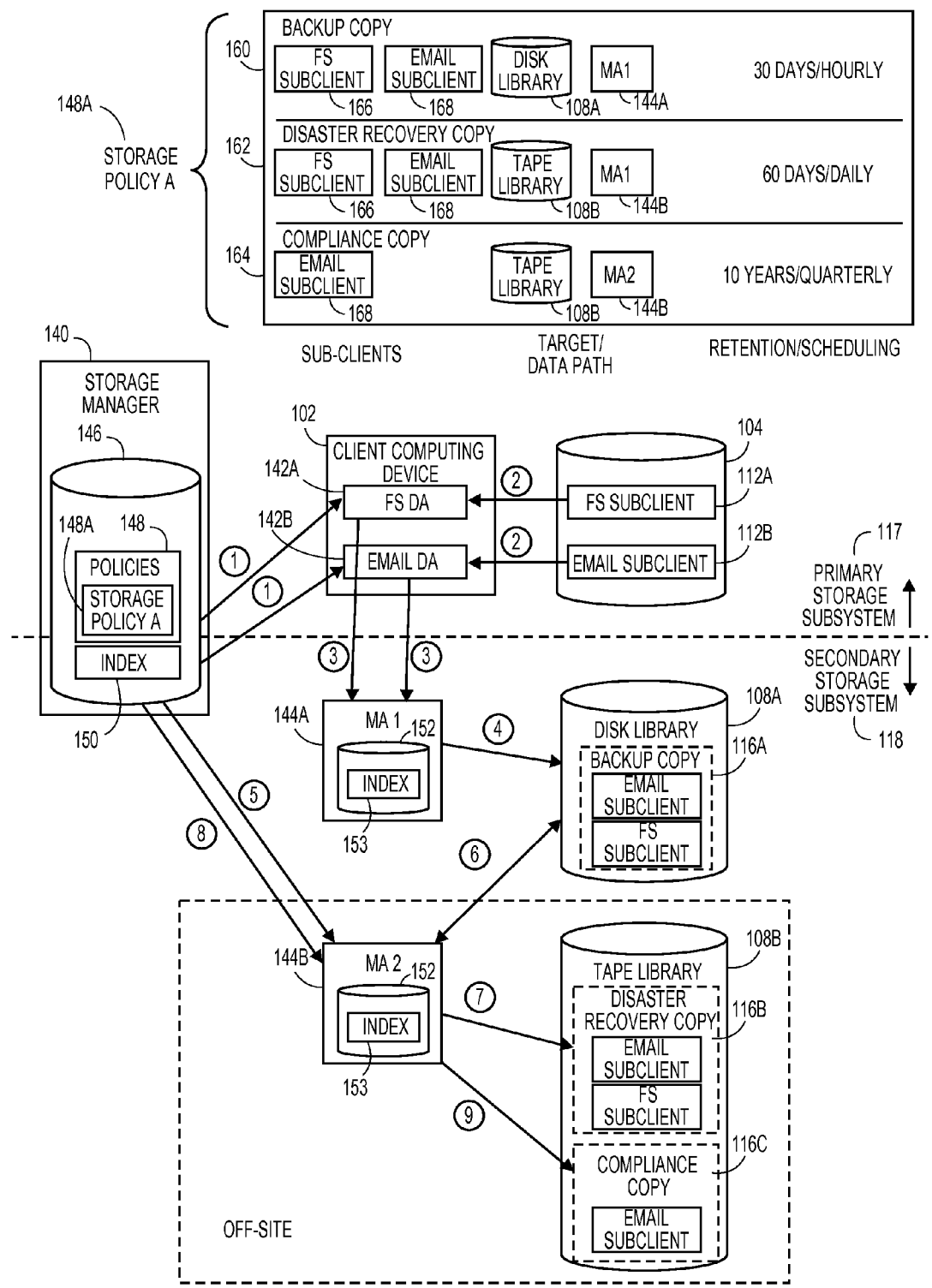
FIG. 1E illustrates certain secondary copy operations according to an exemplary storage policy.

FIG. 1E shows a data flow data diagram depicting performance of storage operations by an embodiment of an information management system 100, according to an exemplary data storage policy 148A. The information management system 100 includes a storage manger 140, a client computing device 102 having a file system data agent 142A and an email data agent 142B residing thereon, a primary storage device 104, two media agents 144A, 144B, and two secondary storage devices 108A, 108B: a disk library 108A and a tape library 108B. As shown, the primary storage device 104 includes primary data 112A, 112B associated with a file system sub-client and an email sub-client, respectively.

As indicated by the dashed box, the second media agent 144B and the tape library 108B are "off-site", and may therefore be remotely located from the other components in the information management system 100 (e.g., in a different city, office building, etc.). In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 112B, include data generated by an e-mail client application operating on the client computing device 102, and can include mailbox information, folder information, emails, attachments, associated database information, and the like. As described above, the sub-clients can be logical containers, and the data included in the corresponding primary data 112A, 112B may or may not be stored contiguously.

The exemplary storage policy 148A includes a backup copy rule set 160, a disaster recovery copy rule set 162, and a compliance copy rule set 164. The backup copy rule set 160 specifies that it is associated with a file system sub-client 166 and an email sub-client 168. Each of these sub-clients 166, 168 are associated with the particular client computing device 102. The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 166, and not the file system sub-client 168. Compliance copies generated according to the compliance copy rule set 164 will therefore not include primary data 112A from the file system sub-client 166. For instance, the organization may be under an obligation to store maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 140 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, minor copy of the backup copy 116A, and remains in the backup format. In other embodiments, the disaster recovery copy 116C may be generated in some other manner, such as by using the primary data 112A, 112B from the storage device 104 as source data. The disaster recovery copy operation is initiated once a day and the disaster recovery copies 116A are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 116A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the media agent index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the storage manager index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 150, 153 accordingly.

During restore, chunks may be processed (e.g., by the media agent 144) according to the information in the chunk header to reassemble the files. Additional information relating to chunks can be found in U.S. Pat. No. 8,156,086, which is incorporated by reference herein.

Integrated Snapshot Interface

Figure 2A:
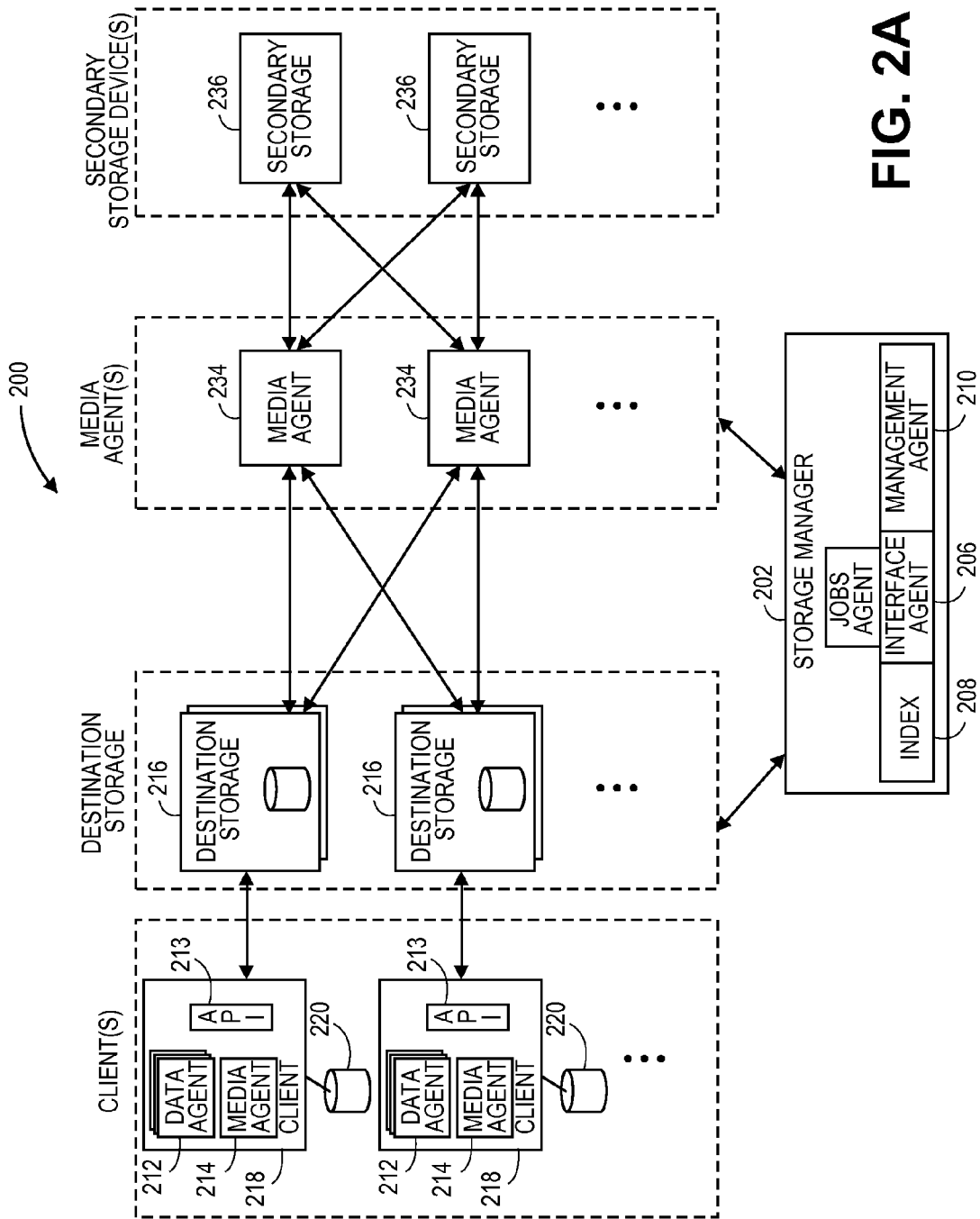

FIG. 2A shows a block diagram illustrative of embodiments of a networked storage system 200 in accordance with the principles of the present disclosure. As shown, storage system 200 may generally include a storage manager 202 and one or more clients 218, destination storage devices 216, media agents 234, and secondary storage devices 236. Examples of modular, scalable storage systems, include the CommVault Simpana system, CommVault QiNetix® system, and the CommVault GALAXY backup system, available from CommVault Systems, Inc. of Oceanport, N.J., and further described in U.S. patent application Ser. Nos. 09/610,738 and 10/818,749, now U.S. Pat. Nos. 7,035,880 and 7,246,207, which are incorporated herein by reference in their entirety.

The system 200 may be one of a plurality of storage operation cells, and generally includes combinations of hardware and software components associated with performing storage operations on electronic data. According to some embodiments of the present disclosure, the storage system 200 is one of a plurality of backup cells which provide some or all of the functionality of backup cells as described in U.S. patent application Ser. No. 09/354,058, which is hereby incorporated by reference in its entirety. However, in certain embodiments, storage operation cells also perform additional types of storage operations and other types of storage management functions, as will be described herein.

In accordance with certain embodiments of the present disclosure, additional storage operations performed by the system 200 may include creating, storing, retrieving, and migrating primary storage data (e.g., the data stored in the information stores 220) and secondary storage data which may include, for example, snapshot copies, backup copies, hierarchical storage management [HSM] copies, archive copies, and other types of copies of electronic data) stored on storage devices 236. The destination storage devices 216 can store primary storage data, secondary storage data, or both, depending on the embodiment. In some embodiments, storage operation system 200 also provides one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to various storage preferences, for example as expressed by a user preference or storage policy. Exemplary storage policies are described above, and in some embodiments, a storage policy can be any of the storage policies described above with respect to FIGS. 1C-E. A storage policy can generally a data structure or other information source that includes a set of preferences and other storage criteria associated with performing a storage operation. The preferences and storage criteria may include, but are not limited to, a storage location, relationships between system components, network pathway to utilize, retention policies, data characteristics, compression or encryption requirements, preferred system components to utilize in a storage operation, other criteria relating to a storage operation, combinations of the same and the like. Thus, in certain embodiments, a storage policy may indicate that certain data is to be stored in a specific storage device, retained for a specified period of time before being aged to another tier of secondary storage, copied to secondary storage using a specified number of streams. A storage policy may be stored in the storage manager index 208, in archive media as metadata for use in restore operations or other storage operations, or in other locations or components of the system.

In certain embodiments, the storage policy may specify when to perform storage operations and how often and may also specify performing certain storage operations on subclients of data and how to treat those sub-clients. A sub-client may represent static or dynamic associations of portions of data of a volume and are typically mutually exclusive. Thus, in certain embodiments, a portion of data may be given a label and the association is stored as a static entity in an index, database or other storage location used by the system. Subclients may also be used as an effective administrative scheme of organizing data according to data type, department within the enterprise, storage preferences, combinations of the same or the like.

For example, an administrator may find it preferable to separate e-mail data from financial data using two different sub-clients having different storage preferences, retention criteria, or the like. The system 200 may contain not only physical devices, but also may represent logical concepts, organizations, and hierarchies. For example, a first storage operation cell 200 may be configured to perform a first type of storage operations such as HSM operations, which may include backup or other types of data migration, and may include a variety of physical components including the storage manager 202 (or management agent 210), the media agent 234, the client component 218, and other components as described herein. A second storage operation cell (not shown) may contain the same or similar physical components, however, it may be configured to perform a second type of storage operations such as storage resource management (SRM) operations, and may include as monitoring a primary data copy or performing other known SRM operations.

Generally speaking, storage manager 202 may be the same or similar to the storage managers 140 described with respect to FIGS. 1C-1E, and may be a software module or other application that coordinates and controls storage operations performed by storage system 200. For example, the storage manager 202 can store and execute the storage policy of the storage network environment. Storage manager 202 can communicate with some or all elements of storage system 200 including, but not limited to clients 218, media agents 234, and storage devices 236, to initiate and manage system backups, migrations, and data recovery. In addition, the storage manager 202 can include a number of components including, but not limited, to a jobs agent 204, an interface agent 206, an index 208, and a management agent 210.

The jobs agent 204 can monitor the status of some or all storage operations previously performed, currently being performed, or scheduled to be performed by storage system 200. The jobs agent 204 can be communicatively coupled with an interface agent 206 (typically a software module or application).

The interface agent 206 can include information processing and display software, such as a graphical user interface ("GUI"), an application program interface ("API"), or other interactive interface through which users and system processes can retrieve information about the status of storage operations. Through interface 208, users may optionally issue instructions to various storage operation cells 200 regarding performance of the storage operations as described and contemplated by the present disclosure. For example, a user may modify a schedule concerning the number of pending snapshot copies or other types of copies scheduled as needed to suit particular needs or requirements. As another example, a user may employ the GUI to view the status of pending storage operations in some or all of the storage operation cells in a given network or to monitor the status of certain components in a particular storage operation cell (e.g., the amount of storage capacity left in a particular storage device).

Storage manager 202 maintains an index 208, which can also be referred to as a database, or other data structure. The data stored in the database 208 can be used to indicate logical associations between components of the system, user preferences, management tasks, media containerization and data storage information or other useful data. For example, the storage manager 202 can use data from the database 208 to track logical associations between the media agent 234 and the storage devices 236 (or movement of data as containerized from primary to secondary storage).

In certain embodiments, the storage manager 202 includes a management agent 210 that is typically implemented as a software module or application program. In general, management agent 210 provides an interface that allows various management components in other storage operation cells 200 to communicate with one another. For example, a certain network configuration includes multiple cells 200 adjacent to one another or otherwise logically related in a wide area network (WAN) or local area network (LAN) configuration (not shown). With this arrangement, each cell 200 may be communicatively coupled to the other through each respective interface agent 206. This allows each cell 200 to send and receive certain pertinent information from other cells 200 including status information, routing information, information regarding capacity and utilization, or the like.

For example, a management agent 210 in a first storage operation cell may communicate with a management agent 210 in a second storage operation cell regarding the status of storage operations in the second storage operation cell. Another illustrative example includes the case where a management agent 210 in a first storage operation cell communicates with a management agent 210 in a second storage operation cell to control the storage manager 202 (and other components) of the second storage operation cell via the management agent 210 contained in the storage manager 202.

Each client 218 can be a separate computing device, a virtual machine instantiated on a host device, or a host device hosting one or more virtual machines. Furthermore, each client 218 can include one or more data agents 212, and one or more data stores 220. The data store 220 can be a local storage device or can be remotely located and communicate with the client over a network, such as a LAN, WAN, etc. In some embodiments, the data store 220 can be physical memory residing within a client computing device. In certain embodiments, such as when the client 218 is a virtual machine, the data store 220 can be a storage device(s) or portion thereof. Generally any type of client data can be stored in the data store 220. For instance, the data store 220 can store files, applications, programs, and other data accessible by the client 218.

Data agent 212 may be the same or similar to the data agents 142 described with respect to FIGS. 1C-1E. The data agent 212 may be a software module or part of a software module that is generally responsible for copying, archiving, migrating, and recovering data from client computer 218 stored in an information store 220 or other memory location. In some embodiments, one data agent 212 and the system can support multiple client computers 218. In certain embodiments, the data agent 212 can be distributed between the client 218 and the storage manager 202 (and any other intermediate components) or can be deployed from a remote location or its functions approximated by a remote process that performs some or all of the functions of data agent 212.

Embodiments of the present disclosure may employ multiple data agents 212 each of which may backup, migrate, and recover data associated with a different application executing on the respective client computing device. For example, different individual data agents 212 may be designed to handle Microsoft Exchange data, Lotus Notes data, Microsoft Windows file system data, Microsoft Active Directory Objects data, and other types of data. Other embodiments may employ one or more generic data agents 212 that can handle and process multiple data types rather than using the specialized data agents 212 described above.

If a client computer 218 has two or more types of data, one data agent 212 may be used for each data type to copy, archive, migrate, and restore the client computer 218 data. For example, to backup, migrate, and restore all of the data on a Microsoft Exchange 2000 server, the client computer 218 may use one Microsoft Exchange 2000 Mailbox data agent 212 to backup the Exchange 2000 mailboxes, one Microsoft Exchange 2000 Database data agent 212 to backup the Exchange 2000 databases, one Microsoft Exchange 2000 Public Folder data agent 212 to backup the Exchange 2000 Public Folders, and one Microsoft Windows 2000 File System data agent 212 to backup the client computer's 218 file system. In such embodiments, these data agents 212 may be treated as four separate data agents 212 by the system even though they reside on the same client computer 218.

Alternatively, other embodiments may use one or more generic data agents 212, each of which may be capable of handling two or more data types. For example, one generic data agent 212 may be used to back up, migrate and restore Microsoft Exchange 2000 Mailbox data and Microsoft Exchange 2000 Database data while another generic data agent may handle Microsoft Exchange 2000 Public Folder data and Microsoft Windows 2000 File System data, or the like.

Data agents 212 may be responsible for arranging or packing data to be copied or migrated into a certain format such as an archive file. Nonetheless, it will be understood this represents only one example and any suitable packing or containerization technique or transfer methodology may be used if desired. Such an archive file may include a list of files or data objects copied in metadata, the file and data objects themselves. Moreover, any data moved by the data agents 212 may be tracked within the system by updating indexes associated appropriate storage managers or media agents.

The system 200 further includes one or more destination storage devices 216, which can include storage devices capable of performing snapshot operations (e.g., hardware and/or software snapshot operations). The storage devices 216 can include locally attached storage with snapshot capabilities. The storage devices 216 can comprise redundant arrays of independent disk (RAID) arrays, for example. For instance, the destination storage devices 216 in some embodiments are configured to create and/or store snapshot copies (in addition to non-snapshot copies) of production data that is generated by applications running on the clients 218, such as the production data stored in the data stores 220. For example, the destination storage devices 216 can be capable of performing hardware-based snapshots (e.g., storage array-based hardware snapshots). The snapshots can be point-in-time images of the production data, or of copies of the production data, including replicated copies, for instance. Although a variety of snapshot techniques are compatible with the embodiments described herein, in some embodiments, the snapshots can be created by maintaining pointers to unchanged data and copying changed data (e.g., blocks), using a copy-on-write methodology, for example.

As shown, the clients 218 can be in communication with the destination storage devices 216. In the illustrated embodiment, each of the clients 218 is in communication with a corresponding set of one or more destination storage devices 216. For instance, each set of destination storage devices 216 may be local to and/or dedicated the corresponding client 218. Each client 218, together with its corresponding information store 220, may be referred herein as a source storage system. Moreover, each destination storage device 216 or group of destination storage devices 216 may additionally be associated with a corresponding computing device, and the destination storage device(s) 216, together with its corresponding computing device, may be referred to as a destination storage system.

In other embodiments, the clients 218 share access to one or more of the destination storage devices 216. For instance, multiple clients can have access to one or more same storage devices 216. Such a configuration is depicted in FIG. 2B, where each of the clients 218 is configured for communication with any of the specialized storage devices 216 (e.g., over a network such as LAN or WAN). In such a configuration, for a given snapshot operation, the storage manager 202 may direct the corresponding client 218 to perform the snapshot using a particular selected one of the specialized storage devices 216. In other cases, one or more of the clients are in communication with subsets (e.g., overlapping subsets) of the destination storage devices 216.

In some cases there is more than one type of destination storage device 216, such as where the some of the destination storage devices 216 are from different vendors. For instance, a destination storage systems of a first type and a second type may provide the same general functionality (e.g., disk-based data storage and snapshot capability), the underlying technical implementations of that functionality differ. Referring to FIG. 2A, for example, in one embodiment at least one of the clients 218 interfaces with at least two destination storage devices 216 having different types. In another embodiment, one of the clients 218 interfaces with one or more destination storage devices 216 having a first type, and at least another of the clients 218 interfaces with one or more destination storage devices 216 having a second type different than the first type. FIG. 2B depicts an example where the clients 218 are in communication with one or more destination storage devices 216 having a first type (TYPE A), one or more destination storage devices having a second type (TYPE B), and one or more destination storage devices 216 having a third type (TYPE C). Generally any number of different types of destination storage devices can be present. In one embodiment, all of the destination storage devices 216 are configured to perform snapshot operations (e.g., hardware snap-shot operations). For instance, the storage devices 216 of TYPE A are hardware snapshot devices from a first vendor and/or having a first underlying technical implementation, the storage devices 216 of TYPE B are hardware snapshot devices from a second vendor having a second underlying technical implementation, and the storage devices 216 of TYPE C are hardware snapshot devices from a third vendor, having a third underlying technical implementation.

In such cases, the clients 218 can include a common snapshot interface 213 (e.g., an API) for communicating with the different types of destination storage devices 216. For instance, the client 218 may have access to implementations (e.g., DLL's) of the common snapshot interface 213 for each type of destination storage device 216. And, depending on the particular destination storage device 216 being used for a given data storage operation, the client 218 will access the corresponding implementation of the common interface 213 for performing the snapshot operation. This technique is described further, with respect to FIGS. 2-4, for example.

The destination storage device(s) 216 may store replicated versions of production data from corresponding client(s) 218. For instance, in some embodiments, the system 200 includes componentry configured to implement continuous data replication (CDR), such that data is copied continuously or substantially continuously from the clients 218 to the destination storage device(s) 216. Examples of CDR processes and configurations usable with embodiments described herein are provided in U.S. Pat. No. 7,651,593, issued Jan. 26, 2010, U.S. Pat. No. 7,661,028, issued Feb. 9, 2010, and U.S. Patent Application Publication No. 2011/0246430, published Oct. 6, 2011, the disclosures of which are hereby incorporated herein by reference in their entirety. Where replicated copies of data from a client system 218 are stored on a destination storage device 216, the destination storage device 216 may create one or more snapshot of the replicated copies.

A media agent 105 may be the same or similar to the media agents 144 described with respect to FIGS. 1C-1E. Generally speaking, a media agent 234, may be implemented as software module that conveys data, as directed by storage manager 202, between a client computer 218 and secondary storage including one or more storage devices 236. The secondary storage devices 236 can generally include any type of physical media capable of storing electronic data, such as the migrated data from the destination storage device(s) 216. In certain embodiments, secondary storage 236 comprises media configured for long-term data retention, such as tape media or the like. In yet other embodiments, the secondary storage 236 can comprise a disk or other type of mass storage. For example, in certain embodiments, the secondary storage 236 advantageously comprises a slower access time and/or a less expensive storage medium than the destination storage device(s) 216. As a few examples, the secondary storage device(s) can include a tape library, a magnetic media storage device, an optical media storage device, or any other suitable storage device.

As shown in the illustrated embodiment, media agents 234 can be used to convey data from destination storage devices 216 (e.g., snapshot capable devices) to the storage devices 236.

In one embodiment, the media agent 234 may be communicatively coupled with and control a storage device 236. A media agent 234 may be considered to be associated with a particular storage device 236 if that media agent 234 is capable of routing and storing data to particular storage device 236.

In operation, the media agent 234 associated with a particular storage device 236 can instruct the storage device to use a robotic arm or other retrieval means to load or eject a certain storage media, and to subsequently archive, migrate, or restore data to or from that media. The media agent 234 can communicate with a storage device 236 via a suitable communications path such as a SCSI or fiber channel communications link. In some embodiments, the storage device 236 can be communicatively coupled to a media agent 234 via a storage area network ("SAN").

Each media agent 234 can maintain an index, database, or other data structure which stores index data generated during backup, migration, and restore and other storage operations as described herein. For example, performing storage operations on Microsoft Exchange data can generate index data. Such index data provides a media agent 234 or other external device with a fast and efficient mechanism for locating data stored or backed up. Thus, in some embodiments, the index of the media agent 234, or a storage manager database 208, can store data associating a client 218 with a particular media agent 234 or storage device 236, for example. The data can be stored as specified in a storage policy, while a database or other data structure in media agent 234 may indicate where specifically the client 218 data is stored in storage device 236, what specific files were stored, and other information associated with storage of client 218 data. In some embodiments, such index data may be stored along with the data backed up in a storage device 236, with an additional copy of the index data written to index cache in a secondary storage device. Thus, the data is readily available for use in storage operations and other activities without having to be first retrieved from the storage device 236.

Generally speaking, information stored in cache is typically recent information that reflects certain particulars about operations that have recently occurred. After a certain period of time, this information is sent to secondary storage and tracked. This information may need to be retrieved and uploaded back into a cache or other memory in a media agent before data can be retrieved from storage device 236. In some embodiments, the cached information may include information regarding format or containerization of archive or other files stored on storage device 236.

While not shown, in other embodiments, media agents can be used to convey data from the clients 218 (e.g., from the data stores 220) to the destination storage devices 216 and/or directly from the clients 218 to the secondary storage devices 236. In such cases, the media agents can be configured to some or all of the functions associated with the media agents 234 described with respect to FIGS. 2A-2B. For instance, one or more media agents can be installed on some or all of the client computing devices 218.

In some embodiments, certain components may reside and execute on the same computer. For example, in some embodiments, a client computer 218 includes the storage manager 202 and coordinates local archiving, migration, and retrieval application functions as further described in U.S. patent application Ser. No. 09/610,738, now issued as U.S. Pat. No. 7,035,880. This client computer 218 can function independently or together with other similar client computers 218. In another embodiment, a client computer 218 includes a media agent 234.

Moreover, clients 218 and media agents 234 may each have associated indices and databases. However, in some embodiments each "tier" of storage, such as primary storage, secondary storage, tertiary storage, or the like, may have multiple or a centralized database. For example, in FIG. 2A, rather than having a separate database associated with each client 218, the databases on this storage tier may be centralized. Similarly, second and other tiers of storage may have either centralized or distributed databases. Moreover, mixed architectures systems may be used if desired, that may include a first tier centralized database system coupled to with a second tier storage system having distributed databases and vice versa.

Moreover, in operation, a storage manager 202 or other management module 210 may keep track of certain information that allows the storage manager 202 to select, designate, or otherwise identify databases to be searched in response to certain queries as further described herein. Movement of data between primary and secondary storage may also involve movement of associated metadata and other tracking information.

In certain embodiments, the system 200 performs file or block-level single instancing, or de-duplication, of the data stored on the destination storage devices 216 and/or the data stored in the information store(s) 220. Examples of single instancing methods and structures usable with embodiments of the invention are discussed in U.S. patent application Ser. No. 12/145,342, filed Jun. 24, 2008, published as U.S. Patent Application Publication No. 2009-0319585 A1, which is hereby incorporated herein by reference in its entirety to be considered part of this specification. In yet other embodiments, the system 200 is configured to perform one or more of the following copy operations on the data stored in the storage device(s) 216 and/or the data stored in the information store(s) 220: archiving, backup, Hierarchical Storage Management ("HSM") copies, Information Lifecycle Management ("ILM") copies or the like.

As described, certain components in the system 200 may communicate with one another over a network, such as for communications between one or more of the storage manager 202 and the client(s) 218, the storage manager 202 and the media agent(s) 234, the client(s) 218 and the destination storage device(s) 216, the destination storage device(s) 216 and the media agent(s) 234. The network(s) can generally comprise any means for communicating data between two or more systems or components. It certain embodiments, the network(s) comprises a computer network. For example, the network(s) may comprise a public network such as the Internet, a virtual private network (VPN), a token ring or TCP/IP based network, a wide area network (WAN), a local area network (LAN), an intranet network, a point-to-point link, a wireless network, a cellular network, a wireless data transmission system, a two-way cable system, an interactive kiosk network, a satellite network, a broadband network, a baseband network, combinations of the same or the like. In some embodiments, separately illustrated components are part of the same computing device. For instance, one or more of the clients 218 and one or more of the destination storage devices 216 may be part of the same computing device. In such cases, the computers can communicate via a communications socket or other suitable internal data transfer path or mechanism.

Common Snapshot Interface Overview

Figure 3A:
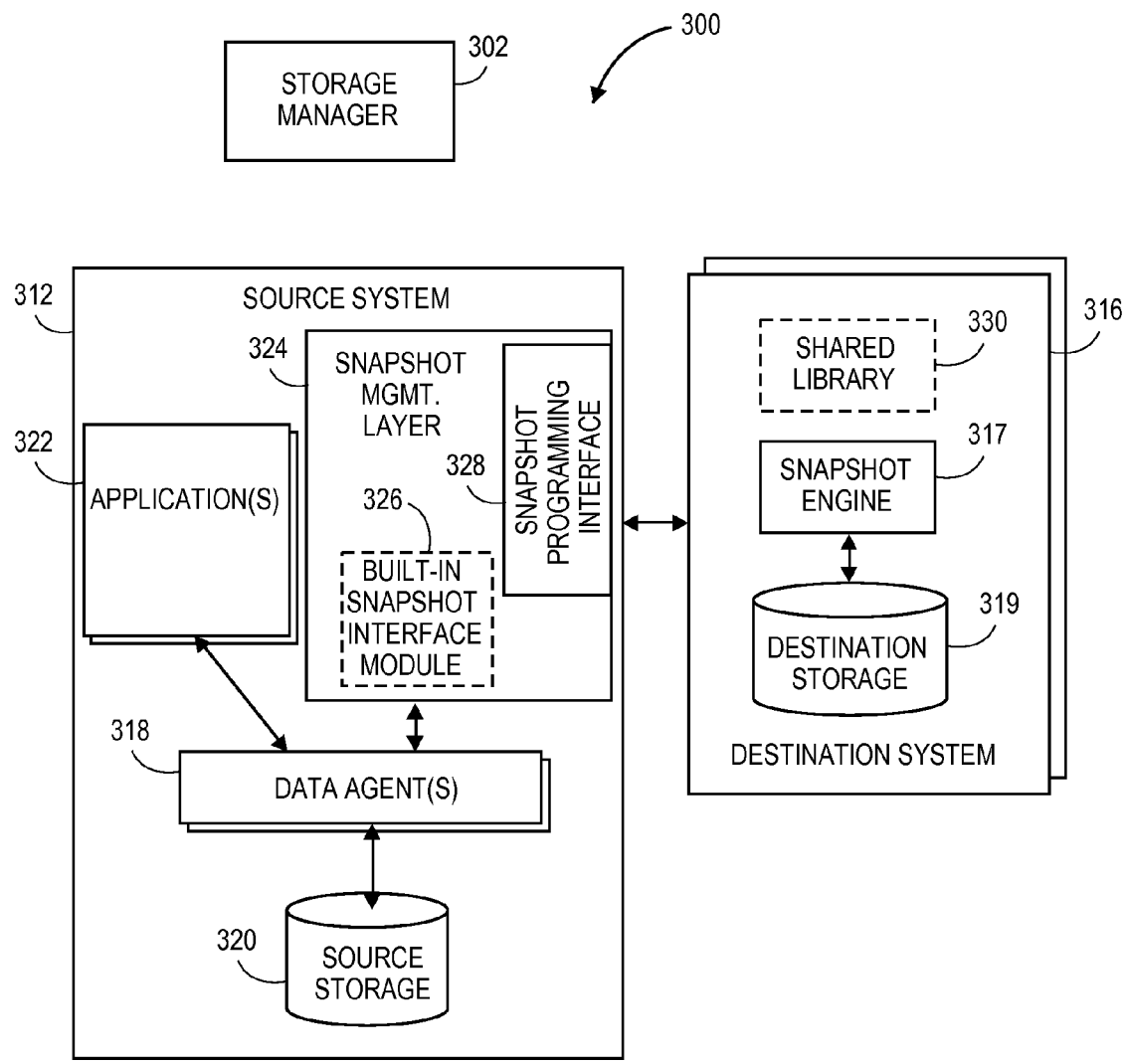
FIG. 3A illustrates an example data storage system implementing a common snapshot interface and in which data is copied to one or more destination systems.

FIG. 3A illustrates an example data storage system 300 implementing a generic snapshot programming interface 328 providing compatibility with a variety of different types of snapshot-capable (e.g., hardware snapshot-capable) destination systems 316.

The system 300 includes a storage manager 302, a source system 312, and at least one destination storage system 316. In general, the components shown in FIG. 3A may be similar to or the same as corresponding components shown in FIGS. 2A and/or 2B. For instance, one or more of the storage manager 302, source system 312, data agent(s) 318, source storage 320, and destination system 316 may be similar to or the same as the storage manager 202, client(s) 218, data agent(s) 218, information store(s) 220, and destination storage device(s) 216, respectively, of FIGS. 2A and/or 2B. Moreover, while not shown in FIG. 3, the destination system 316 may be in communication with one or more media agents, which may in turn be in communication with one or more secondary storage devices in a manner similar to the systems 100 of FIGS. 1A-1B.

The destination system 316 is configured to perform snapshot operations, including hardware snapshots (e.g., storage array-based hardware snapshots), for example. And, as discussed with respect to FIGS. 1A-1B, the source system 312 may be configured to operate with multiple different types of destination systems 316. For instance, in FIG. 3A, the illustrated destination system 316 may be of a first type (e.g., corresponding to a particular storage product from a first vendor and/or having a first underlying technical implementation), and the source system may be compatible with at least a second, and preferably more, types of destination system 316 (e.g., corresponding to particular storage products from second, third, or more vendors and also having different corresponding technical implementations). As just a few examples, the destination system 316 can include snap-shot capable hardware storage arrays or other products available from Hewlett Packard (e.g., 3PAR, EVA and XP), IBM (e.g, SVC, DS, N and XIV), NetApp (e.g., E-series, FAS [including NFS]), Dell (e.g., Compellent, Equallogic and MD), EMC (e.g., VMAX, CLARiiON, Symmetrix & Celerra) and HDS (e.g., VSP, USP & AMS).

The destination system 316 includes a snapshot engine 317, storage 319, and a shared library 330. The destination storage 319 can include may include any type of physical media capable of storing electronic data. For example, the destination storage 319 may comprise magnetic storage, such as a disk or a tape drive, or other type of mass storage. In certain embodiments, the destination storage 319 may be internal and/or external to (e.g., remote to) one or more other components of the destination system 316. In yet other embodiments, the destination storage 319 can include a NAS or the like. In certain embodiments, the destination storage 319 includes relatively fast access times as compared to tape or other relatively slower or less expensive media. For instance, the destination storage can include hard disk drives (HDD's) including spinning media or solid state drives (SDD's) including solid-state storage, such as flash-based or DRAM-based SSD's.

The shared library 330 (e.g., a DLL) can implement and/or be in compliance with the specification of, the common programming interface 328. And the shared library 330 can be accessed by the source system 312 when requesting that snapshot operations be performed by the destination system 316. Interaction between the programming interface 328 and the destination system 316 will be described further below.

The snapshot engine 317 may be a firmware module executing on the corresponding destination system 316. In some embodiments, the snapshot engine 317 is a software module executing on the storage device, or is implemented in hardware on the destination storage device 316. The snapshot engine 317 is configured to manage requested snapshot operations, internal to the destination system 316. Where the storage system(s) 316 comprises a hardware snapshot devices, the snapshot engine 317 for that storage system manages the creation of a snapshot on the corresponding storage device 319. Depending on the type of the destination system 316, the implementation of the snapshot engine 317 can vary. For instance, the snapshot engine 317 of a destination system 316 provided by a first vendor may be different than the snapshot engine 317 of a destination system 316 provided by a second vendor or than a snapshot engine 317 of a different type of destination system 316 provided by the first vendor.

In embodiments where the destination systems 316 are configured to perform hardware snapshot operations, the snapshot engine 317 may be configured to perform the snapshot operation entirely internally to the destination system 316, without any involvement from external components such as the client computing device 312. For instance, as will be described, the source system 312 may request that a snapshot operation be performed, and forward the request along with appropriate parameters to the destination system 316. Afterwards, the source system 312 is not involved in the performance of the snapshot operation, and simply waits for an indication from the destination system 316 regarding the results of the snapshot operation. In another embodiment, the snapshot engine 317 performs the snapshot operation substantially internally to the destination system 316, without significant involvement from external components.

In certain embodiments, the destination system 316 includes one or more separate computing devices (not shown). For instance, where replication is used (e.g., CDR), the destination system 316 may include a separate computing device in communication with the destination system 316 and including a replication module configured to manage replication of the data stored in the source storage 320.

The source system 312 includes one or more applications 322, one or more data agents 318, and a snapshot management layer 324 executing thereon. The applications 322 can include software applications executing on the source system 312 and generally generate and modify production data. As just a few examples, the software applications 322 may include database applications, server software, virtual machine managers, operating systems, file system management software, and other types of applications.

The source storage 320 can include a data store for storing the production data generated by the applications 322. The source storage 320 can include may include any type of physical media capable of storing electronic data. For example, the source storage 320 may comprise magnetic storage, such as a disk or a tape drive, or other type of mass storage. In certain embodiments, the source storage 320 may be internal and/or external to (e.g., remote to) one or more other components of the source system 312. In yet other embodiments, the source storage 320 can include a NAS or the like. In certain embodiments, the source storage 320 includes relatively fast access times as compared to tape or other relatively slower or less expensive media. For instance, the destination storage can include hard disk drives (HDD's) including spinning media or solid state drives (SDD's) including solid-state storage, such as flash-based or DRAM-based SSD's.

The data agents 318 may be the same as or similar to the data agents 212 described with respect to FIGS. 2A-2B, for example, and may generally manage the movement of the production data from the applications to the source storage 320 and/or other locations in the storage system 300. In some embodiments, the data agents 318 manage movement of the production data to the destination system 316 for storage in destination storage 319, either directly, or indirectly (e.g., from the source storage 320), depending on the embodiment. The data agents 318 can also be responsible for backing up, archiving, migrating or otherwise creating copies of production data on secondary storage (not shown), either directly, or via one or more media agents (not shown).

Each data agent 318 may be application-specific and associated with a corresponding application 322, such as any of the applications or types of applications 322 discussed herein. For instance, without limitation, there can be application-specific data agents 318 for DB2, Informix, Microsoft Exchange, Microsoft Hyper-V, Microsoft SharePoint Server, Microsoft SQL Server, Oracle, SAP, and for the Microsoft Windows, Linux and Unix file systems. Alternatively, the data agents 318 may be generic, where each data agent 318 is capable of handling two or more data types, generated by different applications 322. The data agents in some embodiments process the data to provide application-consistent storage of production data.

In some embodiments, the data agents 318 and or media agents (not shown) are in communication with the snapshot management layer 324 and are responsible for conducting data and metadata between the snapshot management layer 324 and the source storage 320 during snapshot operations.

The snapshot management layer 324 can be a software module that is generally configured to manage interaction with the destination system 316 to carry out snapshot operations. The snapshot operations can include, without limitation, snapshot creation, snapshot mounting, snapshot unmounting, snapshot deletion and snapshot reversion. Other possible operations include operations for obtaining a list of generated snapshots, obtaining information related to the amount of storage space used by the snapshot(s), obtaining other desired information related to snapshot(s), setting one or more snapshot attributes, etc. The components of the snapshot management layer 324 in some embodiments work together to gather and/or package the appropriate data and metadata related to the requested snapshot operation for transmission to the destination system 316.

As discussed, the implementation of the components in the destination system 316 can vary. For instance, while any compatible type of destination system 316 may be capable of storing production data and provide snapshot capability (e.g., hardware snapshot capability), the underlying components of destination systems 316 provide by different vendors (or for different products provided by the same vendor) is generally different. Thus, it is desirable for the source system 312 to be compatible with a wide array of different types of destination systems 316.

The common programming interface 328 (e.g., an API) provides a generic interface for interfacing with a wide variety of types of destination system 316, so long as the given destination system 316 operates in compliance with the specification of the common programming interface 328. For instance, the common programming interface 328 includes specifications for a set of common functions and/or associated data types for each of a plurality of different storage operations (e.g., different snapshot operations). In certain embodiments, the common programming interface specifies one or more of the following aspects of each function (e.g., each snapshot function): (1) input parameters; (2) output parameters; (3) expected functional behavioral; and (4) data types for the input parameters and/or output parameters. An example programming interface 328 including a set of common function definitions and data definitions is provided below.

While the common programming interface 328 provides a generic interface for interacting with the different types of destination systems 316, the implementation of the underlying functionality defined by the programming interface 328 will vary depending on the underlying architecture of the particular destination system 316. Thus, for a given destination system 316, the snapshot management layer 324 can have access to a separate shared library 330, that can be an executable library 330 (e.g., a DLL or other shared library) implementing the common programming interface 328, where the implementation of the shared library 330 is specific to the type of the given destination system 316. For instance, where each destination storage device 316 is associated with a different vendor, each vendor may create and/or provide access to an instance of the library 330. As shown, in some embodiments, the shared library 330 is stored on the destination system 316, and can be accessed from the destination system 316 by the source system 312.

Before interacting with the particular destination system 316 to carry out a snapshot operation, the snapshot management layer 324 may access the instance of the shared library 330 from that destination system 316. The management layer 324 can then invoke the appropriate function calls in the library for performing the snapshot operation on the device 316. In some cases, the management layer 324 accesses the DLL or other library 330 from some source other than the destination system 316, such as a server hosted by the particular vendor. In some configurations, the management layer 324 accesses the library 330 from an external source (e.g., from the destination system 316) only initially, such as on start-up of the source system 312 or destination system 316 or prior to the first time the source system 312 requests a snapshot operation or other operation from the destination system 316. The management layer 324 may then register and store the library locally for use in subsequent snapshot or other operations involving that destination system 316. In yet other embodiments, the shared library 330 is pre-installed on or bundled with on the source storage system 312.

The snapshot management layer 324 can be optionally pre-configured for interacting with certain types of destination systems 316, without using the programming interface 328 or shared library 330. For example, the built-in snapshot interface 326 can be a software module or other type of module including pre-configured functionality for interacting with at least one type of destination system 316. As such, for destination storage systems 316 where the built-in interface 316 provides pre-configured support, the snapshot management layer 324 utilizes the built-in interface 326 for interacting with the destination storage devices 316 instead of by accessing a shared library 330 (e.g., a vendor supplied DLL) implementing the common snapshot programming interface 328.

In certain embodiments, the snapshot management layer 324 or portions thereof are implemented on a proxy system (not shown) that is separate from the source system 312, instead of, or in addition to being implemented on the source system 312. The proxy system can therefore be configured to perform some or all of the snapshot management processing, thereby alleviating the associated burden from the source system 312 and improving performance of the source storage system 312.

Example Snapshot Operations

Figure 3B:
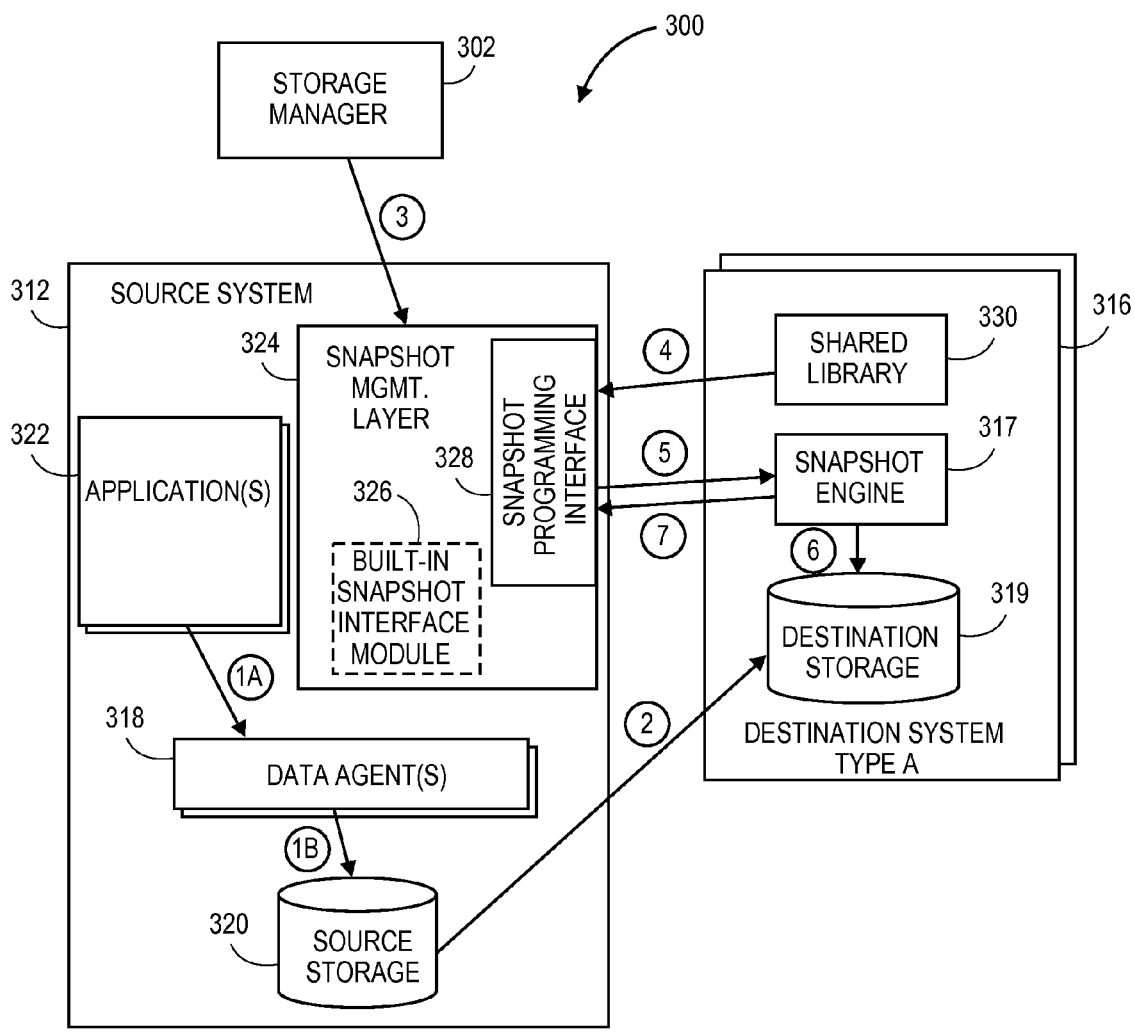
FIGS. 3B-3C illustrate example operational flows for performing storage operations using the data storage system of FIG. 3A.

FIG. 3B is an example flow diagram depicting an operational flow for a snapshot operation involving the common programming interface 328. At steps 1a-1b production data is generated by one or more of the client applications 322 and moved to source storage 320, by the data agent(s) 318 (e.g., in an application-specific and/or application-consistent manner). The production data according to some embodiments is sent directly to the destination system 316 for storage as primary data in the destination storage 319 (e.g., a snapshot capable hardware storage array). In some other cases, the destination system 316 maintains a the primary data on the source storage 320 or a portion thereof (e.g., one or more mirrored or replicated copies of production data or portions thereof [e.g., one or more volumes]). And, where more than one destination system 316 is used, each of the destination systems 316 may maintain some or all of the production data (or copies thereof). For instance, each destination system 316 can maintain a separate copy of all of the production data for redundancy. Or, in one embodiment, each destination system 316 maintains a different portion of the production data, such as one or more particular file system volume(s).

At step 2, a copy of the production data is created on the destination storage 319. For instance, the copy may be a replication or backup copy. Or, as previously indicated, in some other cases, the production data is stored directly on destination storage 319, and the destination system 316 maintains a primary copy of the production data.

At step 3, the storage manager 302 requests that a snapshot operation be performed on the production data or a portion thereof. While the storage manager 302 can request a variety of snapshot operations, for the purposes of the example, the storage manager 302 issues a snapshot creation operation requesting that a snapshot be taken of some or all of the production data. The request is received by the snapshot management layer 324 for processing. Depending on the type of requested snapshot operation, the request can include a variety of information, including an identifier indicating the type of requested snapshot operation, a snapshot identifier identifying a previously created snapshot(s) that is the subject of a request (e.g., a mount, unmount, delete or revert request), information identifying which portion of production is the subject of a requested snapshot (e.g., particular volume(s)). In some embodiments, and for some types of snapshot operations, the management layer 324 requests a copy of any appropriate production data from source storage 320 for use in the snapshot operation.

The snapshot management layer 324 processes the request received from the storage manager 302. For instance, the snapshot management layer 324 can determine or otherwise obtain the type of the target destination system 316. The determination can be made by sending an inquiry over a Small Computer System Interface (SCSI) or other appropriate bus, e.g., to the destination system 316, or to some other device maintaining such information, such as a device that maintains a logical volume manager (LVM). In some embodiments, the management layer 324 determines whether or not the built-in snapshot interface 326 includes built-in support for that particular target destination system 316. In the example shown in FIG. 3B, the destination system is of a first type (TYPE A), and is not supported by the built-in snapshot interface 326. Thus, the management layer 324 attempts to interact with the destination system 316 via the common programming interface 328.

For example, at step 4, the snapshot management layer 324 accesses the shared library 330 associated with the particular destination system 316 and/or associated with the type of the destination system 316, where the library 330 complies with the specifications of the common programming interface 328. In some embodiments, the source system 312 includes a pre-installed copy of the library 330 (e.g., stored in the source storage 320) and accesses the pre-installed copy instead of accessing the library 330 from the destination system. For instance, the library 330 is instantiated on the source system 312 during installation (e.g., installation of the destination system 316) and is loaded into the snapshot management layer 324 using operating system functions (e.g., LoadLibrary for Microsoft Windows and DllOpen for Unix systems).

In some embodiments, where multiple destination systems 316 are used, the management layer 324 may determine which of the destination systems(s) 316 are involved in the current snapshot operation. As just a few examples, each destination system 316 may be associated with one or more file system volumes or directories, with data generated by a particular application, with a particular type of data, etc. And the storage manager 302 may include sufficient information in the request for the snapshot management layer 324 to determine which destination storage system(s) 316 will be used to perform the snapshot operation. For instance, in one embodiment, multiple destination systems 316 may be associated with different file system volumes, and the snapshot request involves a first volume(s). In the request, the storage manager 302 includes an indication of that the first volume(s) is involved in the snapshot operation, or otherwise includes information sufficient for the management layer 324 to derive that the first volume(s) is involved in the operation. Based on this information, the management layer 324 determines that the particular destination system(s) 316 that is associated with the first volume(s) is to be used to perform the snapshot operation. In other embodiments, the storage manager 302 directly indicates to the snapshot management layer 324 which of a plurality of destination system 316 is to be used to perform the snapshot operation.

At step 5, the management layer 324 invokes the appropriate functions in the shared library 330 to initiate performance of the storage request. For instance the management layer 324 processes the snapshot request from the storage manager 302 to determine one or more of the appropriate functions to call in the shared library 330, an order in which to call the functions, and/or a set of appropriate values to provide as inputs to the respective functions. The management layer 324 then causes the snapshot engine to perform the determined functions. For instance, the management layer 324 may transmit to the snapshot engine 317 an indication of the selected functions, the corresponding input values, and/or the specified order of operation. At step 6, the snapshot engine 317 executes the specified functions according to the information received from the source system to perform the requested snapshot operation (e.g., create, mount, unmount, delete or revert a snapshot) on the destination storage 319. A mount snapshot operation may also be referred to as a "map" command, and generally causes a snapshot to become visible or open to access within the storage fabric network by a given source system 312. An unmount snapshot operation, on the other hand, causes the snapshot to become invisible and/or inaccessible to a source system 312. Example mount ("cvso_mapSnaps") and unmount ("cvso_unmapSnaps") functions are shown in the example interface provided below. Example snapshot creation ("cvso_snapDevices"), snapshot deletion ("cvso_deleteSnaps"), and snapshot reversion ("cvso_revertSnaps") functions are also provided below in the exemplary interface. Some other possible snapshot interface functions include operations for: identifying the version of the DLL or other shared library 330 (e.g., "cvso_version", provided below), preparing a destination storage device 319 for a snapshot operation (e.g., "cvso_prepareDevices", provided below), reversing actions that were taken during an operation that prepared the destination storage device 319 for a snapshot operation (e.g., "cvso_unprepareDevices", provided below), and verifying that a snapshot is available for access (e.g., "cvso_reconcileSnaps").

At step 7, once the snapshot operation completes, the destination system 316 reports the results or status to the management layer 324, e.g., via the programming interface 328. For instance, the destination system 316 returns an indication of whether or not the snapshot operation was successful. As in the example, where the operation is a snapshot request, the destination system 316 may return one or more of a snapshot identifier, a time that the snapshot was created, an array identifier (e.g., serial number of storage array), a group identifier (e.g., group in which the snapshot resides), and a device status (e.g., synchronization status of the snapshot, such as for clones).

In some embodiments, more than one destination system 316 can be used to perform the particular snapshot operation. Or, in some embodiments, multiple different snapshot operations occur in parallel on multiple destination systems 316. In yet another embodiment, mirrored snapshots are maintained on different destination storage devices 316 for redundancy.

Figure 3C:
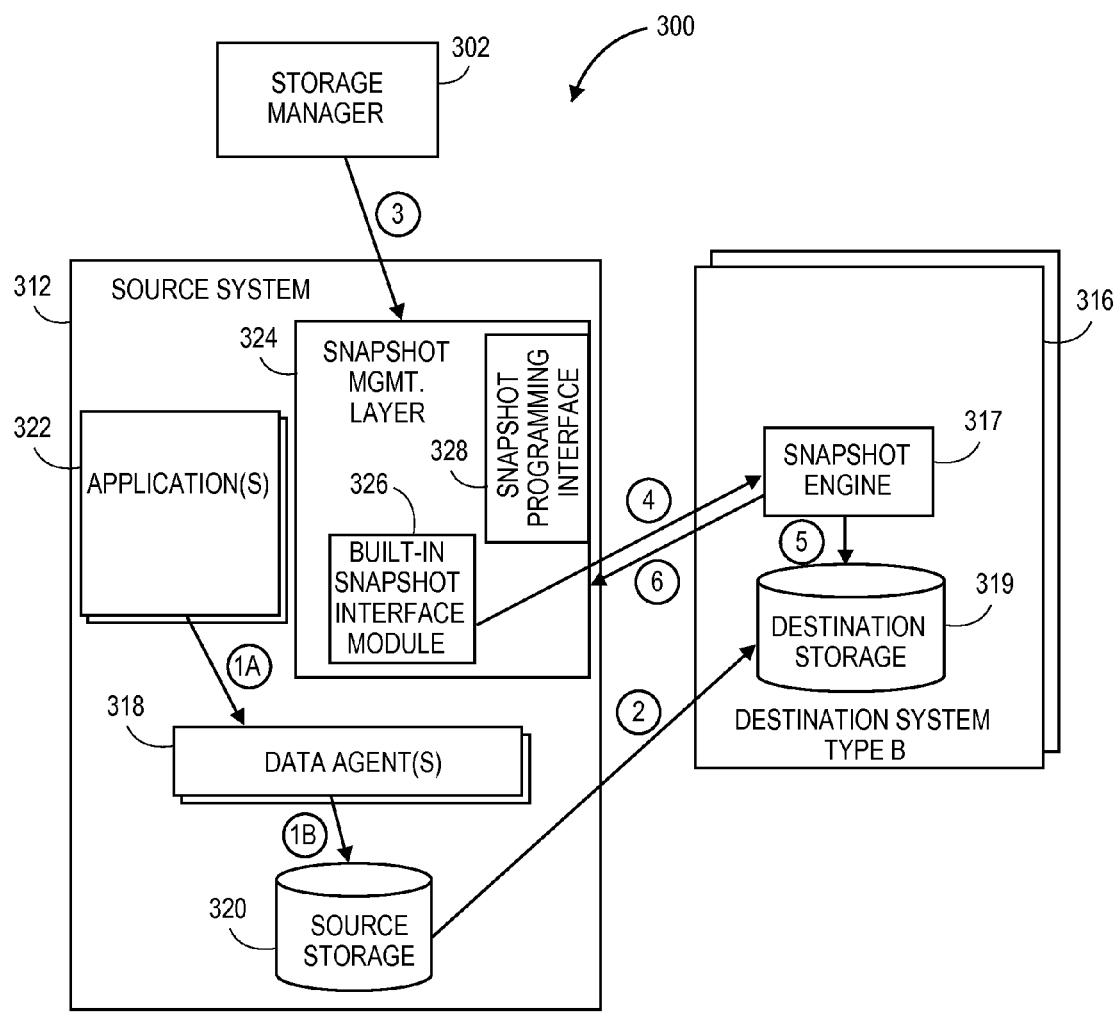

FIG. 3C illustrates another example snapshot operation. The example shown in FIG. 3C differs from the example shown in FIG. 3B in that the snapshot operation depicted in FIG. 3C involves a destination system having a type that is supported by the built-in interface 326 of the snapshot management layer 324. Thus, in contrast to FIG. 3B, the management layer 324 determines, e.g., from data embedded in the snapshot request received from the storage manager 302, that the requested snapshot operation is to be performed on a destination system having a second type (TYPE B) different than the type described above with respect to FIG. 3B.

The management layer 324 then determines that the second type (TYPE B) is supported by the built-in snapshot interface 326. Thus, instead of utilizing the common programming interface as in FIG. 3B, the management layer 324 invokes the built-in snapshot interface 326 to interact with snapshot engine 317 at step 4 to request performance of the snapshot operation. For example, the management layer 324 may invoke and/or execute one or more custom functions associated with the destination system 316. In some embodiments, the functions invoked by the built-in interface do not conform to the specifications defined by the common programming interface 328. Rather, the built-in functions may include or utilize definitions, coding and/or data types specific to the particular type (TYPE B) of the destination system 316 and not generically applicable to other types of destination systems 316, unlike the common programming interface 328. The remaining steps may be similar to those described with respect to FIG. 3B. For instance, at step 5, the snapshot engine 317 performs the snapshot on the destination storage 319. At step 6, the snapshot engine 317 returns an indication as to the results of the operation to the snapshot management layer 324.

Figure 4:
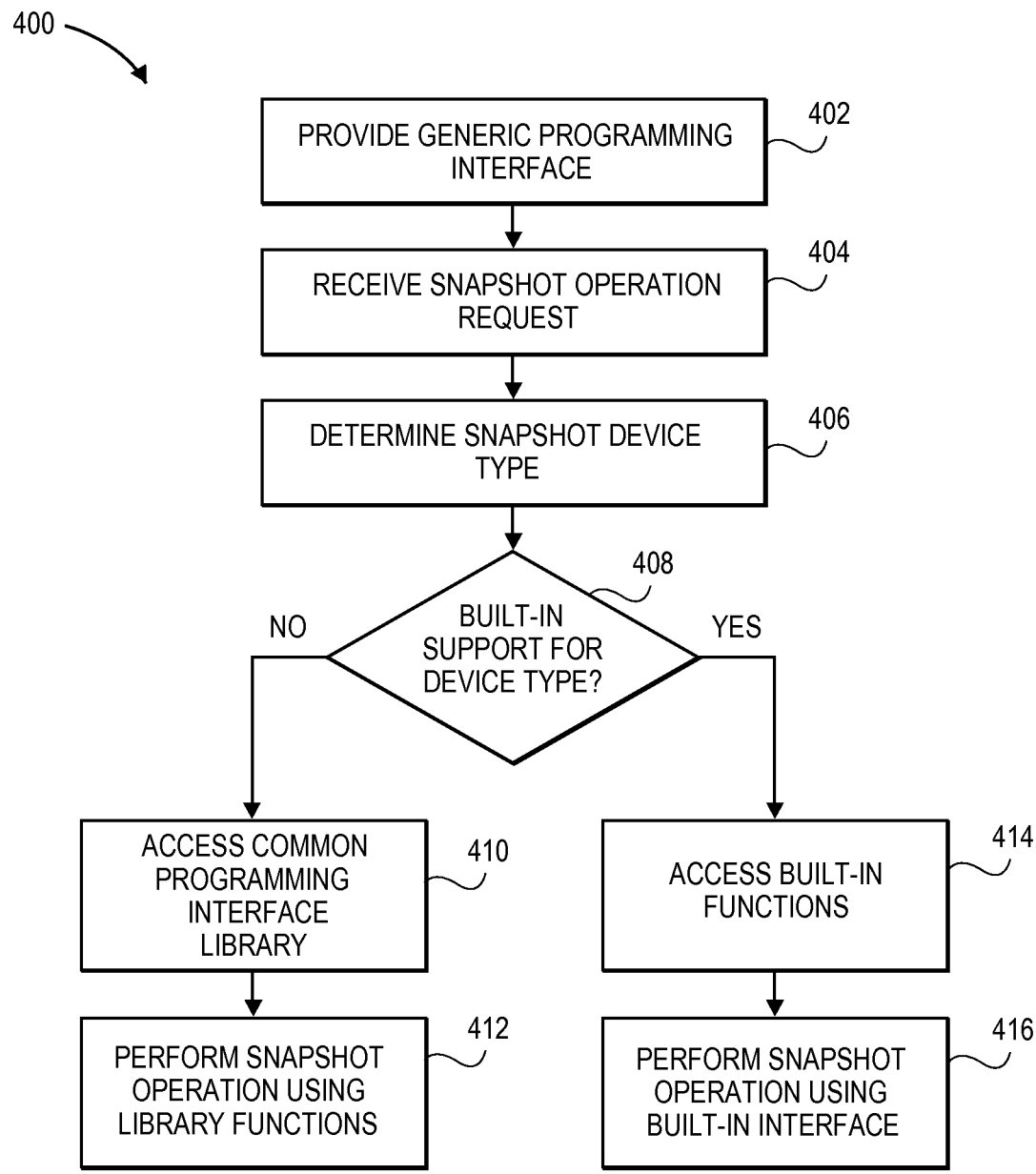
FIG. 4 is a flowchart illustrating an example method for performing snapshot operations using a common snapshot interface, in accordance with embodiments described herein.

FIG. 4 is a flowchart illustrating an example method 400 of performing a snapshot operation. While described with respect to FIGS. 3A-3C, the method 400 is compatible with any of the data storage systems described herein, including the data storage systems 200 shown in FIGS. 2A-2B. At operational block 402, the data storage system provides a generic programming interface. For instance, the generic programming interface specification may be communicated to a set of vendors or other parties tasked with implementing the shared library 330. The programming interface can be an application programming interface (API) that is codified into an interface definition using a programming language (e.g., C++), and API documentation can be provided therewith. At operational block 404, the snapshot management layer 324 receives a snapshot operation request from, e.g., from the storage manager 302. At operational block 406, the management layer 324 determines the device type associated with the destination system 316 on which the snapshot operation is to be performed. For instance, the management layer 324 may extract or derive the identity of the destination system 316 based on information included in the snapshot operation request. And, based on the identity of the destination system 316, the management layer 324 can determine the type of the subject destination system 316.

At decision block 408, based on the determined type, the management layer 324 determines if the built-in snapshot interface 326 includes pre-configured, built-in support for interacting with that type destination system 316. If not, at operational block 410 the management layer 324 accesses a library 330 at block 410 that implements the common programming interface 328 for that type of destination storage system 316. For instance, the library 330 may include vendor-coded functions complying with the specifications set forth by the common programming interface 328. At operational block 412, the destination system 300 performs the snapshot operation. For instance, the management layer 324 invokes the appropriate functions in the accessed library 330, causing the destination storage system 316 to perform the operation, in a manner similar to that described with respect to FIG. 3B. The management layer 324 loads the library 330 and makes direct calls into the library 330 with input parameters provided to the management layer 324. The library 330 then communicates with the destination system 316 to carry out the operation.

On the other hand, if the management layer 324 determines that there is built-in support for the type of the destination system 316, the management layer accesses that built-in functionality at block 414 to cause the destination system 316 to perform the snapshot at block 416, e.g., in a manner similar to that described with respect to FIG. 3C.

Example Common Snapshot Interface

A non-limiting example of a generic programming interface will now be provided. The example programming interface is an API implemented in the C programming language, and may be compiled using a C++ compiler. The interface can be implemented by different vendors providing storage devices capable of performing hardware snapshot operations.

Example Common Snapshot Interface—Example Functions

The following are example functions provided by the example generic snapshot programming interface:

```
/**
* return library version. This information is used for reference and
* will be logged into the log file.
*
* @param major major version
* @param minor minor version
* @param revision revision version
*/
void CVSO_API cvso_version(
    int16_t* major,
    int16_t* minor,
    int16_t* revision);
``` cvso_version return library version. This information is used to identify DLL version. This information will be logged into the log file (CVMA.log).

```
/**
* Verify's if character device charDeviceName belongs to the array that
* this library supports. SNAP_TYPE filed will indicate what kind of snap
* is to be performed. Library can return error message when error occurred
* and errBuf is not NULL. The size of the errBuf is limited by
  errBufSize-1.
* This method can be used to automatically discover the engine.
*
* @param charDeviceName character device name
* @param type snap type expected (SNAP_TYPE::CLONE,
*        SNAP_TYPE::SNAP, SNAP_TYPE::ANY)
* @param errBuf buffer to return error message for logging
* @param errBufSize size of the buffer
* @return CVSO::RC_SUCCESS indicates that charDeviceName is
  supported.
*        CVSO::RC_FAIL_PARTIAL is not supported and
*        CVSO::RC_FAIL value indicate an error.
*/
CVSO::ResultCode CVSO_API cvso_isSupported(
    const char* charDeviceName,
    CVSO::SNAP_TYPE type,
    CVSO::CVOSUtil* osutil,
    char* errBuf,
    int16_t errBufSize );
``` cvso_is Supported should verify if character device charDeviceName belongs to the array that this library supports.

SNAP_TYPE filed will indicate what kind of snap is involved (SNAP or CLONE). Library can return error message when error occurred and errBuf is not NULL. The size of the errBuf is limited by errBufSize−1. This will be used to automatically discover the engine type.

```
/**
* Called to prepare device provided in array for hardware snap.
* It should perform operation on array for upcoming snap operation.
* Update information in the each item from the array for next
* operation or cancelation.
* This function should expect physical device path (character device)
* and snap type provided for each item in the array.
* The status for each item in the array should be set
* READY_FOR_SNAP or READY_FOR_SNAP_FAILED in case of
failure.
* @param array array of the CVSO::SnapInfo classes
* @param count number of items in the array
* @return CVSO::RC_SUCCESS when all items status is set to
* READY_FOR_SNAP, CVSO::RC_FAIL_PARTIAL when one or
* more items status is set to READY_FOR_SNAP_FAILED,
* CVSO::RC_FAIL when all items status is set to
READY_FOR_SNAP_FAILED
*/
CVSO::ResultCode CVSO_API cvso_prepareDevices(
    CVSO::SnapInfo ** array,
    int16_t count,
    CVSO::CVOSUtil* osutil );
``` cvso_prepareDevices called to prepare device provided in array for hardware snap. It should perform appropriate operations on the array for an upcoming snap operation and/or update information in the each item from the array for next operation or cancellation. This function should expect physical device path (character device) and snap type provided for each item in the array. The status for each item in the array should be set READY_FOR_SNAP or READY_FOR_SNAP_FAILED in case of failure.

```
/**
* Undo any operations that was done during cvso_prepareDevice in
* case when snap operation is canceled or prepare failed for some
of the items.
* The status for each item in the array should be set CANCELED or
CANCEL_FAILED.
* @param array array of the CVSO::SnapInfo classes
* @param count number of items in the array
* @return CVSO::RC_SUCCESS when all items status is set to
CANCELED,
*   CVSO::RC_FAIL_PARTIAL when one or more items
status is set to CANCEL_FAILED,
* CVSO::RC_FAIL when all items status is set to
CANCEL_FAILED
*/
CVSO::ResultCode CVSO_API cvso_unprepareDevices(
    CVSO::SnapInfo ** array,
    int16_t count,
    CVSO::CVOSUtil* osutil );
``` cvso_unprepareDevices called when snap operation is canceled or prepare failed for some of the items. The status for each item in the array should be set CANCELED or CANCEL_FAILED

```
/**
* Perform actual snap operation for all items in the array and set status
* to SNAPED or SNAP_FAILED as well as other fields.
* @param array array of the CVSO::SnapInfo classes
* @param count number of items in the array
* @return CVSO::RC_SUCCESS when all items status is set to
* SNAPED, CVSO::RC_FAIL_PARTIAL when one or more items status
* is set to SNAP_FAILED, CVSO::RC_FAIL when all items status is set
to SNAP_FAILED
*/
CVSO::ResultCode CVSO_API cvso_snapDevices(
    CVSO::SnapInfo ** array,
    int16_t count,
    CVSO::CVOSUtil* osutil );
``` cvso_snapDevices perform actual snap operation for all items in the array and set status to SNAPED or SNAP_FAILED as well as all other necessary fields.

```
/**
* Map snaps provided in the array and map to the client machine.
* This call is similar to cvso_isMapped except it will map, locate OS
* device when it is not mapped.
* The character device name should be set using setSnapDevice.
* @param array array of the CVSO::SnapInfo classes
* @param count number of items in the array
* @return CVSO::RC_SUCCESS when all items status is set to
* AVAILABLE, CVSO::RC_FAIL_PARTIAL when one or more items
* status is not set to AVAILABLE, CVSO::RC_FAIL when all items
status is not set to AVAILABLE.
*/
CVSO::ResultCode CVSO_API cvso_mapSnaps(
    CVSO::SnapInfo ** array,
    int16_t count,
    CVSO::CVOSUtil* osutil );
``` cvso_mapSnaps map snaps provided in the array to the client machine. The character device name should be set using setSnapDevice.

```
/**
* Unmap snap from the host.
* This call should not remove OS devices from the host.
* The status for each item in the array should be set to UNMAPPED
* when snap is unmapped from the host.
* Status UNMAPP_FAILED should be set when unmap failed.
* Status should be set to UNKNOWN when snap not found on the
hardware array.
* @param array array of the CVSO::SnapInfo classes
* @param count number of items in the array
* @return CVSO::RC_SUCCESS when all items status is set to
UNMAPPED,
*   CVSO::RC_FAIL_PARTIAL when one or more items
status is set to UNMAPP_FAILED,
* CVSO::RC_FAIL when all items status is set to
UNMAPP_FAILED.
*/
CVSO::ResultCode CVSO_API cvso_unmapSnaps(
    CVSO::SnapInfo ** array,
    int16_t count,
    CVSO::CVOSUtil* osutil );
``` cvso_unmapSnaps nnmap snap from the host. This call should not remove OS devices from the host. The status for each item in the array should be set to UNMAPPED when snap is unmapped from the host. Status UNMAPP_FAILED should be set when unmap failed. Status should be set to UNKNOWN when snap not found on the hardware array.

```
/**
* Delete snaps provided in the array and set status to DELETED.
* This function is called when snap failed or we don't need snap anymore.
* Status should be set to UNKNOWN when snap not found on the
hardware array.
* Status should be set to DELETE_FAILED in case of failure.
* @param array array of the CVSO::SnapInfo classes
* @param count number of items in the array
* @return CVSO::RC_SUCCESS when all items status is set to
```

```
* DELETED, CVSO::RC_FAIL_PARTIAL when one or more items
* status is not set to DELETED, CVSO::RC_FAIL when all items status
is not set to DELETED.
*/
CVSO::ResultCode CVSO_API cvso_deleteSnaps(
    CVSO::SnapInfo ** array,
    int16_t count,
    CVSO::CVOSUtil* osutil );
``` cvso_deleteSnaps delete snaps provided in the array and set status to DELETED. This function is called when snap operation failed or we don't need snap anymore.
Status should be set to UNKNOWN when snap not found on the hardware array. Status should be set to DELETE_FAILED in case of failure.

```
/**
* Perform hardware revert for each item in the array.
* Status should be set to REVERTED in case of success.
* Status should be set to REVERT_FAILED when revert failed.
* Status should be set to UNKNOWN when snap not found on the
  hardware array.
* @param array array of the CVSO::SnapInfo classes
* @param count number of items in the array
* @return CVSO::RC_SUCCESS when all items status is set
  to CANCELED,
*   CVSO::RC_FAIL_PARTIAL when one or more items
status is set to CANCEL_FAILED,
*   CVSO::RC_FAIL when all items status is set to
CANCEL_FAILED
*/
    CVSO::ResultCode CVSO_API cvso_revertSnaps( CVSO::SnapInfo
** array, int16_t count, CVSO::CVOSUtil* osutil );
``` cvso_revertSnaps perform hardware revert for each item in the array. Status should be set to REVERTED in case of success. Status should be set to REVERT_FAILED when revert failed. Status should be set to UNKNOWN when snap not found on the hardware array.

```
/**
* Verify if Snaps provided in array are available on the filer.
* Status should be set for each Snap as EXT_DELETE when snap is
  not available.
* If operation can't be completed or snap is available the status
* should not be changed.
* @param array array of the CVSO::SnapInfo classes
* @param count number of items in the array
```

```
*   @return CVSO::RC_SUCCESS when all items are
available on the filer, CVSO::RC_FAIL_PARTIAL
*   when one or more item's status set with EXT_DELETE, or
*   CVSO::RC_FAIL when operation can't be completed.
*/
    CVSO::ResultCode CVSO_API cvso_reconcileSnaps(
CVSO::SnapInfo ** array, int16_t count, CVSO::CVOSUtil* osutil );
``` cvso_reconcileSnaps verifies if Snaps provided in array are available on the filer. Status should be set for each Snap as EXT_DELETE when snap is not available. If operation can't be completed or snap is available the status should not be changed.

Example Common Snapshot Interface—Example Data Definitions

The following are example data definitions provided by the example generic snapshot programming interface:

Class SnapInfo

The SnapInfo class represents a snap or clone that is associated with a LUN. The interface of this class allows DLL code to set or get property of the snap. The Snap has following standard properties:

Snap UUID: unique identifier of the snap that is known by array. The UUID can be assigned to the snap or clone based on a value from this property and do not change it. In some cases, when array does not allow changing or setting custom snap or clone name, the DLL should set snap UUID based on assigned to clone or snap identifier by array.

```
/**
* Get Sanp Unique Identifier
* By default this value is provided as CV_{CommCell ID}_{Snap ID}
* @param buf will be populated with Snap Unique Identifier
* @param bufSize size ofthe buffer.
* @return CVSO::RC_SUCCESS, CVSO::RC_FAIL_PARTIAL - buf is
*         too small and bufSize will be set with size of the data.
*/
virtual ResultCode getSnapUUID( char* buf, int16_t& bufSize ) = 0;
/**
* Set Snap Unique Identifier
* @param uuid snap Unique Identifier
* @return CVSO::RC_SUCCESS, CVSO::RC_FAIL
*/
virtual ResultCode setSnapUUID( char* uuid ) = 0;
```

Array Information: Each array can be registered in SnapBackup database. The registration information includes:
    hostid—reference number in the database table
    engineId

```
/**
* Get Array info.
* Array info returned in jason format (http://www.json.org/)
* Fields:
*       hostid
*       engineId
*       portNumber
*       hostFlags
*       hostStatus
*       hostOption
*       sourceId
*       vendorName
*       arrayId
*       hostIp
*       hostName
*       hostUserName
*       hostPassword
*       engineName
*       deviceGroupName
*       reserve1
*       reserve2
```

```
*         reserve3
* @param arrayinfo buffer to return jason formated array information
* @param infoSize size of the arrayinfo buffer
* @return CVSO::RC_SUCCESS, CVSO::RC_FAIL - error,
*              CVSO::RC_FAIL_PARTIAL - buf is too small and bufSize will be set
*              with size of the data.
*/
virtual ResultCode getArrayInfo( char* arrayinfo, int16_t& infoSize ) = 0;
/**
* Provides array name to map Array Info to the Snap
* @param hostName array host name
* @return CVSO::RC_SUCCESS, CVSO::RC_FAIL - error,
*              CVSO::RC_FAIL_PARTIAL - array not found in database.
*/
virtual ResultCode setArrayInfo( const char* hostName ) = 0;
/**
* Associate Array Info using array control host name
* @param hostName array host name
* @return CVSO::RC_SUCCESS, CVSO::RC_FAIL - error,
* CVSO::RC_FAIL_PARTIAL - array not found in database.
*/
virtual ResultCode setArrayInfoByCtrlHostName ( const char* controlHostName ) = 0;
/**
* Get host identifier to use while call CVOSUtil methods
* @param buf buffer to store host identifier (will be provided
*              in format '//hostname' or empty)
* @param bufSize size of the buffer
* @return
*/
virtual ResultCode getHostIdentifier( char* buf, int16_t& bufSize ) = 0;
/**
* Get Snap Type
* @return in case of error –1 will be returned, otherwise snap
*              type id is returned
*/
virtual int16_t getSnapType( ) = 0;
/**
* Set snap type
* @param snapType snap type id
* @return CVSO::RC_SUCCESS, CVSO::RC_FAIL,
*              CVSO::RC_FAIL_PARTIAL - the value is not allowed
*/
virtual ResultCode setSnapType( int16_t snapType ) = 0;
/**
* Check if flags passed as flagMask are set
* @param flagMask bit mask for the flags
* @return true if all flags from flagMask is set, false if one or
*              all flags are not set
*/
virtual bool isFlagSet( int32_t flagMask ) = 0;
/**
* Add flag(s) spicified in flagMask to the snap flag
* @param flagMask bit mask for the flags
* @return CVSO::RC_SUCCESS, CVSO::RC_FAIL - error,
*              CVSO::RC_FAIL_PARTIAL - some of the flags are not allowed
*              to be changed by Engine Layer
*/
virtual ResultCode setFlag( int32_t flagMask ) = 0;
/**
* Returns the flag set. This is needed just to get the whole flagMask
* when one needs to pass it across.
*/
virtual int32_t getFlag( ) = 0;
/**
* Remove flag(s) spicified in flagMask to the snap flag
* @param flagMask bit mask for the flags
* @return CVSO::RC_SUCCESS, CVSO::RC_FAIL - error,
*              CVSO::RC_FAIL_PARTIAL - some of the flags are not allowed
*              to be changed by Engine Layer
*/
virtual ResultCode clearFlag( int32_t flagMask ) = 0;
/**
* Get current snap status
* @return snap status
*/
virtual SnapStatus getStatus( ) = 0;
/**
* Set new snap status
* @param status new status
```

```
 * @return CVSO::RC_SUCCESS, CVSO::RC_FAIL - error
 */
virtual ResultCode setStatus( SnapStatus status ) = 0;
/**
 * Get OS local device name (character device) for source device where
 * sanp will be taken or was taken
 * @param buf buffer to store device name
 * @param bufSize size of the buffer
 * @return CVSO::RC_SUCCESS, CVSO::RC_FAIL - error,
 *          CVSO::RC_FAIL_PARTIAL - buf is too small and bufSize will
 *          be set with size of the data.
 */
virtual ResultCode getSourceDevice( char* buf, int16_t& bufSize ) = 0;
/**
 * Set OS local device name where Source is mapped to the host,
 * should be called only in case of revert if needed
 * @param buf device name
 * @return CVSO::RC_SUCCESS, CVSO::RC_FAIL - error
 */
virtual CVSO::ResultCode setSourceDevice ( const char* buf ) = 0;
/**
 * Get OS local device name (character device) known to be a Snap
 * mapped to the host
 * @param buf device name
 * @param bufSize size of the buffer
 * @return CVSO::RC_SUCCESS, CVSO::RC_FAIL - error
 */
virtual ResultCode getSnapDevice( char* buf, int16_t& bufSize ) = 0;
/**
 * Set OS local device name (character device) where Snap is
 * mapped to the host
 * @param buf device name
 * @return CVSO::RC_SUCCESS, CVSO::RC_FAIL - error
 */
virtual ResultCode setSnapDevice( const char* buf ) = 0;
/**
 * Get Shadow Copy Id (Windows only)
 * @param buf buffer to store device name
 * @param bufSize size of the buffer
 * @return unique identifier
 */
virtual ResultCode getShadowCopyId( char* buf, int16_t& bufSize ) = 0;
/**
 * Set Shadow Copy Id (Windows only)
 * @param buf device name
 * @return CVSO::RC_SUCCESS, CVSO::RC_FAIL - error
 */
virtual ResultCode setShadowCopyId( const char* buf ) = 0;
/**
 * Get meta data associated with snap
 * @param typeId meta data type
 * @param buffer c-string for meta data
 * @param bufSize size of the meta data buffer (maximum data will be
 *          stared in buffer is bufSize-1).
 * @return CVSO::RC_SUCCESS, CVSO::RC_FAIL - error,
 *          CVSO::RC_FAIL_PARTIAL - buf is too small and bufSize will
 *          be set with size of the data.
 */
virtual ResultCode getMetaData( int16_t typeId, char* buffer, int16_t& bufSize ) = 0;
/**
 * Set/delete meta data associated with snap.
 * Meta data of the same type will be replaced.
 * Meta data of type typeId will be deleted if c-string length is 0 or
 * it is passed as NULL.
 * @param typeId meta data type
 * @param buffer c-string data
 * @return CVSO::RC_SUCCESS, CVSO::RC_FAIL - error,
 *          CVSO::RC_FAIL_PARTIAL - data is too large
 */
virtual ResultCode setMetaData( int16_t typeId, char* buffer ) = 0;
/**
 * Log error code and message
 * @param errorCode error code, 0 - no error, any other value - error
 * @param msg error messages
 */
virtual void setError( int32_t errorCode, const char* msg ) = 0;
/**
 * Gets the errorCode and the Message
 * @param errorCode error code, 0 - no error, any other value - error
```

```
 * @param msg error messages
 */
virtual void getError( int32_t &errorCode, char* msg ) = 0;
/**
 * Log message in msg to the CommVault current log file with log
 * level set to LogLevel
 * @param level log level
 * @param msg c-string message
 */
virtual void logMessage( LogLevel level, const char* msg ) = 0;
/**
 * Log message in msg to the CommVault current log file with log
 * level set to LogLevel
 * @param DebugLvl log level
 * @param function c-string with function name that is send the messages
 * @param msg c-string format string for message
 */
virtual void logMessage(int DebugLvl, const char *function, const char *umessage,
...)=0;
/**
 * Set the GroupId bit. This will group luns lying on the same
 * array volume (especially for NetApp) in one group
 * This information can then be used by the engine to create one
 * snap / group instead of one snap per lun.
 * @param int16_t iGroupId groupid
 */
virtual CVSO::ResultCode setGroupId(int iGroupId) = 0;
/**
 * Get the GroupId bit.
 * @return int16_t iGroupId - groupid
 */
virtual int GroupId( ) = 0;
```

Terminolgy

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments have been described, these embodiments have been presented by way of example only, and are not intended to limit the scope of the disclosure. Indeed, the novel methods and systems described herein may be embodied in a variety of other forms; furthermore, various omissions, substitutions and changes in the form of the described methods and systems may be made without departing from the spirit of the disclosure. The accompanying claims and their equivalents are intended to cover such forms or modifications as would fall within the scope and spirit of the disclosure.

What is claimed is:

1. A data storage system, comprising:
    a source system in communication with a destination system comprising a first storage device, the first storage device configured to perform snapshot operations;
    at least one software application executing on the source system and generating production data;
    a snapshot management module executing on one or more processors and configured to:
        receive a request to perform a snapshot operation involving a stored version of at least a portion of the production data that resides on the first storage device;
        determine that the first storage device is a first type of a plurality of types of storage devices, wherein each type of the plurality of types corresponds to a different vendor and/or a different product from a particular vendor;
        determine that the source system does not include built-in support for the first storage device based at least in part on the determined first type;
        communicate with the destination system to identify one or more functions for performing the requested snapshot operation and that are defined at least in part by a programming interface specification residing on the source systems; and
        invoke instances of the one or more identified functions that are in compliance with the programming interface specification and are implemented specifically for storage devices of the first type,
    wherein a snapshot engine residing on the first storage device is responsive to the invoking of the instances of the one or more identified functions to perform the requested snapshot operation,
    wherein the snapshot management module includes pre-configured functionality for interacting with storage devices having at least a different type without using the programming interface specification to perform snapshot operations, and
    wherein the pre-configured functionality includes one or more functions that are not in compliance with the programming interface specification residing on the source system.

2. The data storage system of claim 1, wherein the instances of the one or more identified functions are accessed from a shared library associated with the first type of storage device.

3. The data storage system of claim 2, wherein the shared library is accessed by the source system from the first storage device.

4. The data storage system of claim 1, wherein the first storage device is configured to perform hardware snapshots.

5. The data storage system of claim 1, wherein the requested snapshot operation includes one or more of a snapshot creation operation, a snapshot mount operation, and a snapshot revert operation.

6. The data storage system of claim 1, wherein the snapshot management module resides on the source system.

7. The data storage system of claim 1, wherein the source system is in communication with a second storage device of a second type and that is configured to perform snapshot operations, and wherein the snapshot management module is further configured to:
    receive a request to perform a snapshot operation involving a stored version of at least a portion of the production data that resides on the second storage device;
    process the request to identify one or more functions for performing the requested snapshot operation and that are defined at least in part by the programming interface specification; and
    invoke instances of the one or more identified functions that are in compliance with the programming interface specification and are implemented specifically for storage devices of the second type,
    wherein a snapshot engine residing on the second storage device is responsive to the invoking of the instances of the one or more identified functions to perform the requested snapshot operation.

8. The data storage system of claim 7, wherein the instances of the one or more identified functions that are implemented for the first type of storage device are provided by a first vendor and wherein the instances of the one or more identified functions that are implemented for the second type of storage device are provided by a second vendor.

9. The data storage system of claim 1, wherein the snapshot management module resides on one or more processors of the source system.

10. The data storage system of claim 1, wherein the snapshot management module resides on one or more processors of a proxy computing device that is separate from the source system.

11. A method of performing one or more snapshot operations on production data generated in a data storage system, the method comprising:
    receiving a request to perform a snapshot operation involving a stored version of at least a portion of production data that resides on a first storage device of a destination system, the production data generated by at least one software application executing on a source system that is in communication with the first storage device, the first storage device configured to perform snapshot operations;
    determining that the first storage device is a first type of a plurality of types of storage devices, wherein each type of the plurality of types corresponds to a different vendor and/or a different product from a particular vendor;
    determining that the source system does not include built-in support for the first storage device based at least in part on the determined first type;
    communicating with the destination system to identify one or more functions for performing the requested snapshot operation and that are defined at least in part by a programming interface specification residing on the source system; and invoking, using one or more computer processors, instances of the one or more identified functions that are in compliance with the programming interface specification and are implemented specifically for storage devices of the first type, wherein a snapshot engine residing on the first storage device is responsive to the invoking of the instances of the one or more identified functions to perform the requested snapshot operation, wherein the source system includes pre-configured functionality for interacting with storage devices having at least a different type without using the programming interface specification to perform snapshot operations, and wherein the pre-configured functionality includes one or more functions that are not in compliance with the programming interface specification residing on the source system.

12. The method of claim 11, further comprising accessing the instances of the one or more identified functions from a shared library associated with the first type of storage device.

13. The method of claim 12, wherein the shared library is accessed by the source system from the first storage device.

14. The method of claim 11, wherein the first storage device is configured to perform hardware snapshots.

15. The method of claim 11, wherein the requested snapshot operation includes one or more of a snapshot creation operation, a snapshot mount operation, and a snapshot revert operation.

16. The method of claim 11, wherein the source system is in communication with a second storage device of a second type and that is configured to perform snapshot operations, the method further comprising:

receiving a request to perform a snapshot operation involving a stored version of at least a portion of the production data that resides on the second storage device;

processing the request to identify one or more functions for performing the requested snapshot operation and that are defined at least in part by the programming interface specification; and invoking instances of the one or more identified functions that are in compliance with the programming interface specification and are implemented specifically for storage devices of the second type, wherein a snapshot engine residing on the second storage device is responsive to the invoking of the instances of the one or more identified functions to perform the requested snapshot operation.

17. The method of claim 16, wherein the instances of the one or more identified functions that are implemented for the first type of storage device are provided by a first vendor and wherein the instances of the one or more identified functions that are implemented for the second type of storage device are provided by a second vendor.

* * * * *